(12) United States Patent
Worsley et al.

(10) Patent No.: US 8,629,076 B2
(45) Date of Patent: Jan. 14, 2014

(54) HIGH SURFACE AREA SILICON CARBIDE-COATED CARBON AEROGEL

(75) Inventors: Marcus A. Worsley, Hayward, CA (US); Joshua D. Kuntz, Livermore, CA (US); Theodore F. Baumann, Discover Bay, CA (US); Joe H. Satcher, Jr., Patterson, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 307 days.

(21) Appl. No.: 13/051,915

(22) Filed: Mar. 18, 2011

(65) Prior Publication Data

US 2012/0077006 A1  Mar. 29, 2012

Related U.S. Application Data

(63) Continuation-in-part of application No. 12/694,425, filed on Jan. 27, 2010, now abandoned.

(60) Provisional application No. 61/315,512, filed on Mar. 19, 2010.

(51) Int. Cl.

| | | |
|---|---|---|
| B01J 21/18 | (2006.01) |
| B01J 23/02 | (2006.01) |
| B01J 23/06 | (2006.01) |
| B01F 3/04 | (2006.01) |
| B01F 3/06 | (2006.01) |
| B01F 3/00 | (2006.01) |
| B01F 17/00 | (2006.01) |
| C09K 3/30 | (2006.01) |
| C09K 3/00 | (2006.01) |
| B01J 13/00 | (2006.01) |
| B01F 3/08 | (2006.01) |
| C08L 91/08 | (2006.01) |
| C08L 95/00 | (2006.01) |
| C09D 195/00 | (2006.01) |
| B01D 21/01 | (2006.01) |
| C08J 3/02 | (2006.01) |
| B32B 9/00 | (2006.01) |
| D02G 3/00 | (2006.01) |
| B32B 5/16 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |
| B05D 5/12 | (2006.01) |
| B05D 7/00 | (2006.01) |
| B05D 3/02 | (2006.01) |
| C23C 16/00 | (2006.01) |
| C23C 4/10 | (2006.01) |
| C23C 4/04 | (2006.01) |
| B05D 3/00 | (2006.01) |
| H05H 1/02 | (2006.01) |
| H05H 1/24 | (2006.01) |
| C23C 16/48 | (2006.01) |
| C23C 8/00 | (2006.01) |
| C23C 16/24 | (2006.01) |
| C23C 16/30 | (2006.01) |

(52) U.S. Cl.
USPC ........ 502/183; 516/1; 516/9; 516/38; 516/99; 977/742; 428/367; 428/402; 428/404; 427/113; 427/219; 427/229; 427/249.15; 427/450; 427/452; 427/568; 427/574; 427/577; 427/578; 427/579; 427/583; 427/584; 427/589

(58) Field of Classification Search
USPC ............... 502/183; 516/1, 9, 38, 99; 977/742; 428/367, 402, 404; 427/113, 219, 228, 427/249.15, 249.16, 450, 452, 568, 574, 427/577–579, 583, 584, 589
See application file for complete search history.

(56) References Cited

U.S. PATENT DOCUMENTS

| | | | |
|---|---|---|---|
| 5,260,855 A | 11/1993 | Kaschmitter et al. |
| 5,409,683 A | 4/1995 | Tillotson et al. |
| 5,601,938 A | 2/1997 | Mayer et al. |
| 5,698,140 A * | 12/1997 | Lamb et al. ................... 252/502 |
| 5,855,953 A * | 1/1999 | Cao et al. ...................... 427/226 |
| 6,500,401 B2 | 12/2002 | Reznek et al. |
| 6,653,356 B2 | 11/2003 | Sherman |

| | | |
|---|---|---|
| 6,809,060 B2 | 10/2004 | Suh et al. |
| 6,843,919 B2 | 1/2005 | Klabunde et al. |
| 6,906,003 B2 | 6/2005 | Struthers et al. |
| 6,986,818 B2 | 1/2006 | Tillotson et al. |
| 7,005,401 B2 | 2/2006 | Lu et al. |
| 7,074,880 B2 | 7/2006 | Rhine et al. |
| 7,256,147 B2 | 8/2007 | Yamada et al. |
| 7,270,851 B2 | 9/2007 | Sullivan |
| 7,282,466 B2 | 10/2007 | Long et al. |
| 7,378,450 B2 | 5/2008 | Erkey et al. |
| 7,390,474 B2 * | 6/2008 | Suzuki et al. ............ 423/445 R |
| 7,410,718 B2 | 8/2008 | Cooper et al. |
| 7,442,747 B1 | 10/2008 | Long et al. |
| 7,780,875 B2 | 8/2010 | Asgari |
| 7,799,726 B2 * | 9/2010 | Pham-Huu et al. ........... 502/180 |
| 7,927,666 B2 | 4/2011 | Ajayan et al. |
| 8,172,964 B2 | 5/2012 | Gash et al. |
| 8,383,238 B2 * | 2/2013 | Burchill, Jr. ................. 428/404 |
| 2002/0094426 A1 | 7/2002 | Stepanian et al. |
| 2004/0176643 A1 | 9/2004 | Sato et al. |
| 2006/0293434 A1 | 12/2006 | Yodh et al. |
| 2007/0292732 A1 | 12/2007 | Feaver et al. |
| 2008/0261116 A1 * | 10/2008 | Burton et al. ............... 429/231.8 |
| 2009/0123358 A1 | 5/2009 | Costa et al. |
| 2009/0185327 A1 | 7/2009 | Seymour |
| 2009/0229032 A1 | 9/2009 | Stepanian et al. |
| 2009/0317619 A1 | 12/2009 | Di Monte et al. |
| 2010/0028634 A1 | 2/2010 | Turevskaya et al. |
| 2010/0075024 A1 | 3/2010 | Ajayan et al. |
| 2010/0139823 A1 | 6/2010 | Gash et al. |
| 2010/0187484 A1 | 7/2010 | Worsley et al. |
| 2010/0190639 A1 | 7/2010 | Worsley et al. |
| 2011/0024698 A1 | 2/2011 | Worsley et al. |
| 2012/0028798 A1 * | 2/2012 | Worsley et al. ............... 502/439 |
| 2012/0037854 A1 | 2/2012 | Worsley et al. |
| 2012/0077006 A1 * | 3/2012 | Worsley et al. ............... 428/219 |
| 2012/0122652 A1 | 5/2012 | Worsley et al. |

FOREIGN PATENT DOCUMENTS

| | | | | |
|---|---|---|---|---|
| WO | 2006/102568 | * | 9/2006 | ............ H01L 29/24 |
| WO | WO-2008/000163 | | 1/2008 | |

OTHER PUBLICATIONS

Baumann et al., "High surface area carbon aerogel monoliths with hierarchical porosity", J. Non-Cryst. Solids, 354:3513-3515 (2008).

Becker et al., "Layered Silicate Nanocomposites Based on Various High-Functionality Epoxy Resins: The influence of Cure Temperature on Morphology, Mechanical Properties, and Free Volume" Macromolecules 36:1616-1625 (2003).

Bordjiba, T. "New Class of Carbon-Nanotube Aerogel Electrodes for Electrochemical Power Sources". Advanced Materials, 20:815-819. (2008).

Bryning et al., "Carbon Nanotube Aerogels", Advanced Materials 19:661-664 (2007).

Gregg et al., Adsorption, Surface Area and Porosity, Academic, London, 2nd edn, 1982.

Hasegawa et al., "Fabrication of macroporous silicon carbide ceramics by intramolecular carbothermal reduction of phenyl-bridged polysilsesquioxane", J. Mater. Chem., 19:7716-7720 (2009).

Hwang et al., "Synthesis and Characterization of Tin Oxide/Carbon Aerogel Composite Electrodes for Electrochemical Supercapacitors". Journal of Power Sources, 172:451-459 (2007).

Keller et al., "Influence of the preparation conditions on the synthesis of high surface area SiC for use as a heterogeneous catalyst support", J. Mater. Sci. 34:3189-3202 (1999).

Krawiec et al., "Thermal stability of high surface area silicon carbide materials" J. Solid State Chem., 179:2281-2289 (2006).

Kucheyev et al., "Ion-beam-induced stiffening of nanoporous silica" J. Phys. D: Appl.Phys., 42:182003-182006 (2009).

Kucheyev et al., "Depth-Sensing Indentation of Low-Density Brittle Naoporous Solids." Acta Materialia 57:3472-3480 (2009).

Ledoux et al., "New Synthesis and Uses of High-Specific-Surface SiC as a Catalytic Support that is Chemically Inert and Has High Thermal Resistance" J. Catal., 114:176-185 (1988).

Lee et al., "Carbon-coated nano-Si dispersed oxides/graphite composites as anode material for lithium ion batteries" Electrochem. Commun., 6:465-469 (2004).

Lee et al., "Shrinkage ratio of PDMS and it's alignment method for the wafer level process" Microsyst Technol, 14:205-208 (2008).

Li et al., "Porous Silicon Carbide/Carbon Composite Microspherules for Methane Storage" J. Nat. Gas Chem., 16:363-370 (2007).

Li et al., "Synthesis and characterization of carbon-doped titania as an artificial solar light sensitive photocatalyst" Chem. Phys. Lett., 404:25-29 (2005).

Maldonado-Hodar et al., "Metal-Carbon Aerogels as Catalysts and Catalyst Support". Studies in Surface Science and Catalysis, 130:1007-1012 (2000).

Mishra et al., "Synthesis of carbon nanotube-TiO2 nanotubular material for reversible hydrogen storage" Nanotechnology, 19:445607(7pp) (2008).

Moene et al., "Coating of Activated Carbon with Silicon Carbide by Chemical Vapour Deposition" Carbon 34(5):567-579 (1996).

Moreno-Castilla et al., "Group 6 metal oxide-carbon aerogels. Their Synthesis, characterization and catalytic activity in the skeletal isomeriation of 1-butene," Applied Catalysis A: General 183:345-356 (1999).

Nhut et al., "Synthesis and catalytic uses of carbon and silicon carbide nanostructures" Catal. Today, 76:11-32 (2002).

Pekala et al., "Carbon Aerogels for Electrochemical Applications". Journal of Non-Crystalline Solids, 225:74-80 (1998).

Petricevic et al., "Planar Fibre Reinforced Carbon Aerogels for Application in PEM Fuel Cells". Carbon 39:857-867 (2001).

Poole et al. "Introduction to Nanotechnology". John Wiley & Sons, 2003.

Preiss et al., "Formation of Black Glasses and Silicon Carbide From Binary Carbonaceous/Silica Hydrogels", Carbon 33(12):1739-1746 (1995).

Sakthivel et al., "Daylight Photocatalysis by Carbon-Modified Titanium Dioxide" Angew. Chem., Int. Ed., 42:4908-4911 (2003).

Stegenga et al., "Stability of Carbon-Supported Catalysts in an Oxidizing Environment", Carbon, 30(4):577-585 (1992).

US Office Action on U.S. Appl. No. 13/281,185 DTD May 15, 2013.

US Office Action on U.S. Appl. No. 12/652,616 DTD Oct. 9, 2012.

Vix-Guterl et al., "Effect of the Properties of a Carbon Substrate on its Reaction with Silica for Silicon Carbide Formation", Carbon, 35(10-11):1587-1592 (1997).

Worsley et al. "High Surface Area Carbon Nanotube-Supported Titanium Carbonitride Aerogels". J. Mater. Chem., 19:5503-5506 (2009).

Worsley et al. "Properties of single-walled carbon nanotube-based aerogels as a function of nanotube loading". Acta Materialia, 57:5131-5136 (2009).

Worsley et al., "Synthesis and Characterization of Carbon Aerogel Nanocomposites Containing Double-walled Carbon Nanotubes" ACS Philadelphia Aug. 17, 2008.

Worsley et al., "Synthesis and Characerization of Monolithic Carbon Aerogel Nanocomposites Containing Double-walled Carbon Nanotubes" Langmuir 24:9763-9766 (2008).

Worsley, M. et al. "Mechanically robust and electrically conductive carbon nanotube foams". Applied Physics Letters, 94:073115 (2009).

Worsley, M. et al. "Route to High Surface Area TiO2/C and TiCN/C Composites". J. Mater. Chem., 19:7146-7150 (2009).

Worsley, M. et al. "Stiff and Electrically Conductive Composites of Carbon Nanotube Aerogels and Polymers". J. Mater. Chem., 19:3370-3372 (2009).

Worsley, M. et al. "Synthesis and Characterization of Nanocarbon-Supported Titanium Dioxide". Mater. Res. Soc. Proc. vol. 1174, 2009 (6 pp).

Yang et al., "SiOx-based anodes for secondary lithium batteries" Solid State Ionics 152-153:125-129 (2002).

Zheng et al., "Preparations of C/SiC composites and their use as supports for Ru catalyst in ammonia synthesis", J. Mol. Catal. A: Chem. 301:79-83 (2009).

Zhu et al., "Fast hydrogen generation from NaBH4 hydrolysis catalyzed by carbon aerogels supported cobalt nanoparticles," International Journal of Hydrogen Energy pp. 1-7 (2013).

* cited by examiner

*Primary Examiner* — Patricia L Hailey
(74) *Attorney, Agent, or Firm* — Foley & Lardner, LLP

(57) ABSTRACT

A metal oxide-carbon composite includes a carbon aerogel with an oxide overcoat. The metal oxide-carbon composite is made by providing a carbon aerogel, immersing the carbon aerogel in a metal oxide sol under a vacuum, raising the carbon aerogel with the metal oxide sol to atmospheric pressure, curing the carbon aerogel with the metal oxide sol at room temperature, and drying the carbon aerogel with the metal oxide sol to produce the metal oxide-carbon composite. The step of providing a carbon aerogel can provide an activated carbon aerogel or provide a carbon aerogel with carbon nanotubes that make the carbon aerogel mechanically robust. Carbon aerogels can be coated with sol-gel silica and the silica can be converted to silicon carbide, improving the thermal stability of the carbon aerogel.

33 Claims, 14 Drawing Sheets

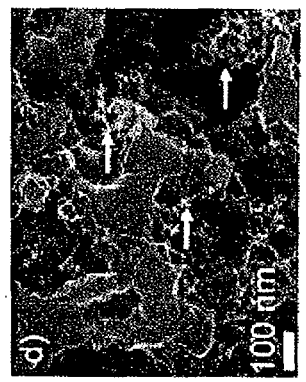
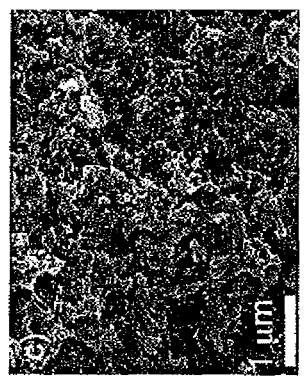
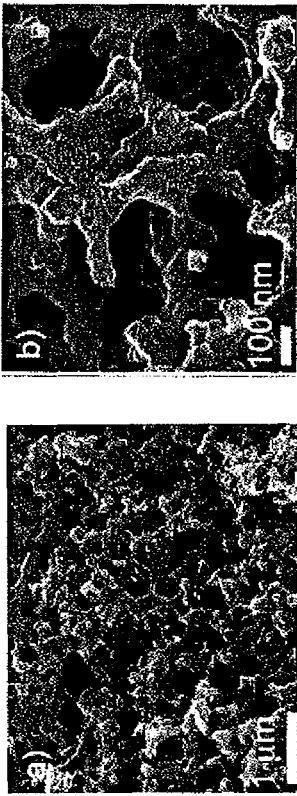
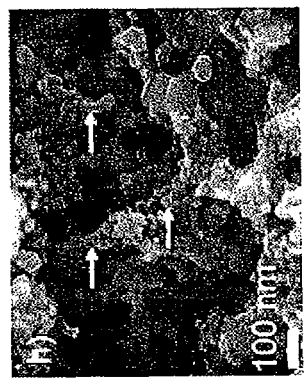
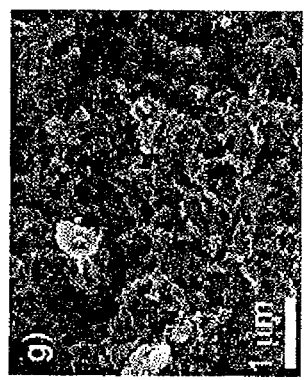
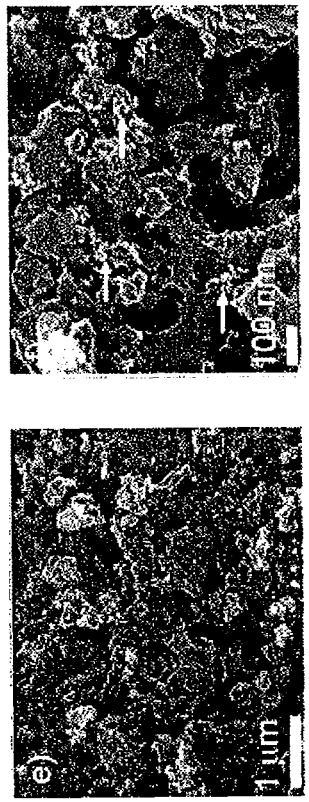

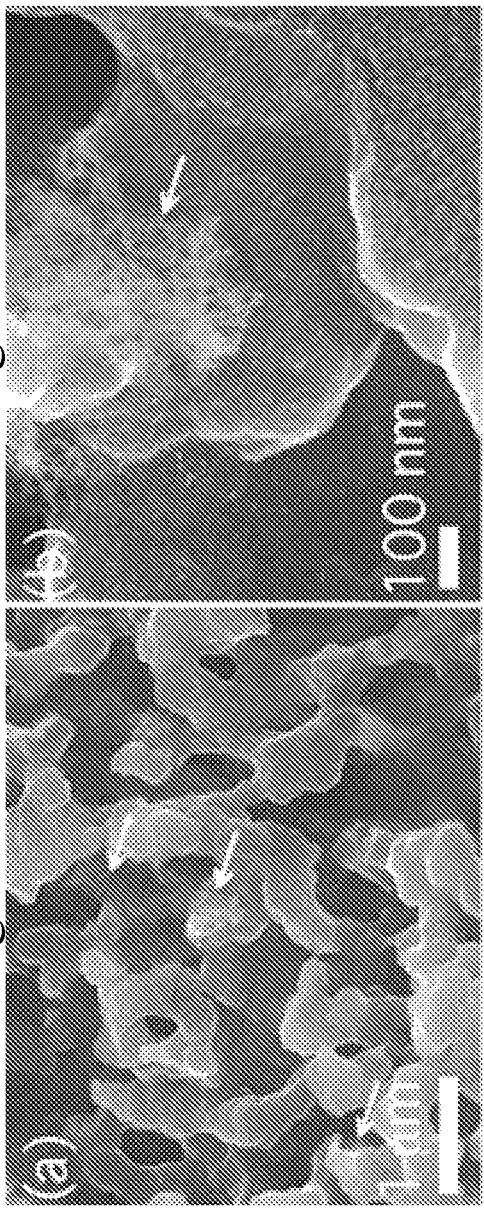

HIGH SURFACE AREA SILICON CARBIDE-COATED CARBON AEROGEL

CROSS-REFERENCE TO RELATED APPLICATIONS

This application is a continuation-in-part of application Ser. No. 12/694,425 filed on Jan. 27, 2010, the disclosure of which is hereby incorporated by reference herein in its entirety. This application also claims the benefit of the filing date of U.S. application No. 61/315,512, filed on Mar. 19, 2010, the disclosure of which is hereby incorporated by reference herein in its entirety.

STATEMENT OF GOVERNMENT RIGHTS

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Porous metal oxides can be prepared by a number of techniques ranging from sol-gel synthesis to various templating/support methods. These porous metal oxides have shown enhanced catalytic activity, compared to bulk material, but are still limited by surface areas less than 1000 $m^2/g$. This is even the case when using high surface area templates such as SBA-15 or MCM-41. Surface areas for the templated metal oxides can be less than 200 $m^2/g$. The use of supports, such as carbon nanotubes, also yields surface areas less than 300 $m^2/g$. Another issue presented by many porous metal oxides is that their pore structure collapses at elevated temperatures. For example in titania aerogels, this lack of pore stability results in order of magnitude decreases in surface area under heating. The presence of silica has been shown to provide some stabilization of pores at high temperatures in titania-silica composites. However, the surface area is still significantly decreased under heating.

Carbon nanotubes (CNTs) possess a number of intrinsic properties that have made them promising materials in the design of composite materials. CNTs can have electrical conductivities as high as $10^6$ $Sm^{-1}$, thermal conductivities as high as 3000 $Wm^{-1}K^{-1}$, elastic moduli on the order of 1 TPa, and are extremely flexible. Unfortunately, the realization of these properties in macroscopic forms such as foams and composites has been limited. Foams, though conductive, tend to be mechanically weak due to their dependence on van der Waals forces for mechanical integrity.

The treatise, *Introduction to Nanotechnology*, by Charles P. Poole, Jr., and Frank J. Owens. John Wiley &. Sons, 2003, states: "Nanotechnology is based on the recognition that particles less than the size of 100 nanometers (a nanometer is a billionth of a meter) impart to nanostructures built from them new properties and behavior. This happens because particles which are smaller than the characteristic lengths associated with particular phenomena often display new chemistry and physics, leading to new behavior which depends on the size. So, for example, the electronic structure, conductivity, reactivity, melting temperature, and mechanical properties have all been observed to change when particles become smaller than a critical size."

In addition, developing novel porous carbons and carbon composites remains important for a range of current and emerging technologies such as batteries, hydrogen storage, catalysis, and adsorbents. (References 1-8) Porous carbons are promising candidates for these applications because they possess high surface areas, are chemically stable, and have high electrical conductivities. Unfortunately, carbon has some key drawbacks that limit its performance in certain cases. Carbon has a fairly low resistance to oxidation at elevated temperatures, limiting the operating temperature of carbon-supported catalysis in an oxidative environment. A common way to improve the thermal stability of a porous carbon is to cover its inner surface with a more thermally stable material (e.g. an oxide or carbide) to serve as a barrier to oxygen diffusion. (References 5,9) Typically, thermal stability is improved but surface area is dramatically reduced. The reduction in surface area occurs because the micropores, present in large quantities in most porous carbons, are blocked by the depositing species, decreasing the accessible active sites. Furthermore, if high temperature treatment (e.g. carbothermal reduction) is used to produce a carbide coating, additional surface area is lost due to sintering. Therefore, though the thermal stability may be enhanced, the surface area can be reduced to less than half that of the original porous carbon. The design of a high surface area carbon containing hierarchical porosity (micro- and macropores) could minimize the instance of micropore blockage, providing a support that could accept deposition of a thermally stable oxide or carbide while maintaining a high surface area.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention in its various embodiments relates to metal oxide and more particularly to a high surface area, electrically conductive nanocarbon-supported metal oxide. Additional embodiments also relate to nano-carbon supported silicon carbide.

Embodiments described herein include compositions and devices, methods of making compositions and devices, and methods of using compositions and devices.

For example, the present invention in its various embodiments provides a metal oxide-carbon aerogel composite that includes a carbon aerogel with a metal oxide overcoat. The metal oxide-carbon composite is made, in one embodiment, by providing a carbon aerogel, immersing the carbon aerogel in a metal oxide sol under a vacuum, returning the carbon aerogel with the metal oxide sol to atmospheric pressure, curing the carbon aerogel with the metal oxide sol at room temperature, and drying the carbon aerogel with the metal oxide sol to produce the metal oxide-carbon composite. The step of providing a carbon aerogel can be providing an activated carbon aerogel or providing a carbon aerogel with carbon nanotubes that make the carbon aerogel mechanically robust.

Another embodiment provides, for example, a composition comprising at least one carbon aerogel and at least one silica coating or at least one silicon carbide coating disposed on the aerogel. In one embodiment, the composition comprises at least one silicon carbide coating on the aerogel. In one embodiment, the composition comprises at least one silicon carbide coating on the aerogel, and wherein the oxygen content is zero according to energy dispersion x-ray analysis. In one embodiment, the composition comprises at least one silicon carbide coating on the aerogel, wherein the coating comprises silicon carbide nanocrystals. In one embodiment, the composition comprises at least one silica coating on the aerogel. In one embodiment, the composition has a surface area of at least 2,000 m$^2$/g. In one embodiment, the carbon aerogel is an activated carbon aerogel. In one embodiment, the carbon aerogel comprises carbon nanotubes. In one embodiment, the carbon aerogel has a surface area of greater than 3,000 m$^2$/g before the coating is disposed on the aerogel. In one embodiment, the coating is a conformal coating on the inner surfaces of the aerogel. In one embodiment, the coating improves the thermal stability of the carbon aerogel according to TGA. In one embodiment, the composition is mostly microporous with remaining pore volume primarily in the large meso- and macroporous range. In one embodiment, the silica comprises sol-gel-derived silica. In one embodiment, the silicon carbide is formed as a carbothermal reduction of a silica coating. In one embodiment, the coating comprises substantially no silicon oxide. In one embodiment, the aerogel has a bimodal porosity. In one embodiment, the carbon aerogel is an activated carbon aerogel and the silicon carbide coating is present, and the composition has a surface area of at least 2,000 m$^2$/g. In one embodiment, the carbon aerogel is an activated carbon aerogel and the silicon carbide coating is present, and the composition has a surface area of at least 2,000 m$^2$/g, and wherein the carbon aerogel has a surface area of greater than 3,000 m$^2$/g before the coating is disposed on the aerogel.

Another embodiment provides a composition comprising at least one activated carbon aerogel and at least one silicon carbide coating disposed on the activated carbon aerogel, wherein the composition has a surface area of at least 2,000 m$^2$/g. In one embodiment, the silicon carbide coating increases the thermal stability of the composition.

Another embodiment provides, for example, a method comprising: forming a silica coating on a carbon aerogel, heating the coated aerogel to thermally convert the silica coating into a silicon carbide coating. In one embodiment, the silica comprises sol-gel-derived silica. Another embodiment further comprises drying the coated aerogel by supercritical extraction in carbon dioxide prior to heating. In another embodiment, the silicon carbide coating comprises a layer of SiC nanocrystals. In another embodiment, the coated and heated aerogel has a surface area greater than about 2,000 m$^2$/g. In another embodiment, the coating of silica and silicon carbide are formed on inner surfaces of the aerogel. In another embodiment, the carbon aerogel is an activated carbon aerogel. In another embodiment, the carbon aerogel has a bimodal porosity. In another embodiment, the carbon aerogel has a bimodal porosity, wherein one mode has a pore size of about 10 nm or less, and the other mode has a pore size of about 100 nm or more. In another embodiment, the carbon aerogel has a surface area of at least about 3,000 m$^2$/g.

Another embodiment provides, for example, a method, comprising: coating the inner surface of an activated carbon aerogel (ACA) with a silica sol, reacting the silica sol to undergo gelation and form a silica sol-gel, curing and drying the sol-gel to nucleate silicon oxide particles to yield a SiO$_2$/ACA composite, and heating the SiO$_2$/ACA composite to form a SiC/ACA composite. In another embodiment, the silica sol fills the pore volume prior to gelation. In one embodiment, the SiC/ACA composite comprises a surface area greater than about 2,000 m$^2$/g.

In one embodiment, during the heating step, the SiO$_2$ is completely converted to SiC. In one embodiment, the heating comprises heating at about 1,500° C.

An advantage for at least one embodiment is high thermal stability and/or high surface area for the aerogel, including the combination of these properties.

The invention in its various embodiments has use as, for example, a commercial catalyst. The invention in its various embodiments also has use as an electrode, for example as an electrode for batteries and super capacitors. The invention in its various embodiments also has use in, for example, water purification, electrical/electrochemical energy storage, solar energy, and hydrogen storage.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

FIGS. 6A-H are SEM images of ACA (a,b), as-prepared TiO$_2$/ACA (c,d), heat-treated TiO$_2$/ACA (e,f), and TiCN/ACA (g,h) at different magnifications. Arrows indicate particles of amorphous (d), crystalline TiO$_2$ (f), and TiCN (h).

FIGS. 8A-D are SEM images of as-prepared SiO$_2$/ACA and SiC/ACA. The arrows indicate particles of SiO$_2$. FIGS. 8a and 8b show low and high magnification SiO$_2$/ACA, respectively.

FIGS. 8c and 8d show low and high magnification SiC/ACA, respectively.

DETAILED DESCRIPTION

Introduction

Figure 1A:
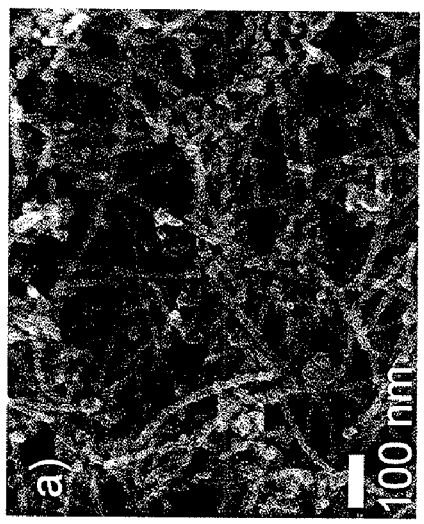
FIGS. 1A and 1B are SEM and TEM images of TiO$_2$/SWNT-CA.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Embodiments described herein provide a metal oxide-carbon composite that includes a carbon aerogel with an oxide overcoat. The metal oxide-carbon composite is made by providing a carbon aerogel, immersing the carbon aerogel in a metal oxide sol under a vacuum, returning the carbon aerogel with the metal oxide sol to atmospheric pressure, curing the carbon aerogel with the metal oxide sol-gel at room temperature to produce the metal oxide-carbon wet gel composite, and drying the metal oxide-carbon wet gel composite to produce the metal oxide-carbon aerogel composite. The step of providing a carbon aerogel can be providing an activated carbon aerogel or providing a carbon aerogel with carbon nanotubes that make the carbon aerogel mechanically robust. Apparatus and method of providing an aerogel and a metal oxide are described in U.S. Pat. No. 6,986,818, U.S. Pat. No. 7,270,851; U.S. Pat. No. 7,410,718; U.S. Published Patent Application No. 20090123358; Published Patent Application No. 20090229032; and Published Patent Application No. 20090317619. U.S. Pat. No. 6,986,818, U.S. Pat. No. 7,270,851; U.S. Pat. No. 7,410,718; U.S. Published Patent Application No. 20090123358; Published Patent Application No. 20090229032; and Published Patent Application No. 20090317619 are incorporated herein in their entirety by this reference for all purposes.

DEFINITION TERMS

Various terms used in this patent application are defined below.
CA=Carbon Aerogel
CNT=Carbon Nanotubes
CA-CNT=Carbon Aerogel & Carbon Nanotube Composite
SWNT=Single-Walled Carbon Nanotubes
DWNT=Double-Walled Carbon Nanotubes
SDBS=Sodium Dodecylbenzene Sulfonate
MESOPOROUS=Pore Dia. 2-50 nm
PVA=Polyvinyl Alcohol
CVD=Chemical Vapor Deposition
TEM=Transmission Electron Microscopy
SEM=Scanning Electron Microscopy
R/C=Resorcinol to Catalyst Ratios
RF=Resorcinol and Formaldehyde Solids
BET=Brunauer-Emmett-Teller
Mechanically Robust=Can withstand strains greater than 10% before fracture
Electrically Conductive=Exhibits an electrical conductivity of 10 S/m or greater
Ultralow-Density=Exhibits densities less than 50 mg/cc
Carbon Nanotube-Based Aerogel=Porous carbon material consisting of 5 to 95% carbon nanotubes by weight.

EXAMPLES

The present invention provides a method of making a metal oxide-carbon composite, comprising the steps of providing an aqueous media or other media to form a suspension, adding reactants and catalyst to said suspension to create a reaction mixture, curing said reaction mixture to form a wet gel, drying said wet gel to produce a dry gel, pyrolyzing said dry gel to produce an aerogel,immerse said aerogel in a metal oxide sol under a vacuum, returning said aerogel and said metal oxide sol to atmospheric pressure, curing said aerogel at room temperature, and drying said aerogel producing an aerogel oxide composite. The metal oxide-carbon composite comprises a carbon aerogel, said carbon aerogel having inner surfaces, and an oxide coating said inner surfaces of said carbon aerogel providing an aerogel oxide composite. In one embodiment the carbon aerogel is a carbon aerogel with carbon nanotubes that make said carbon aerogel mechanically robust. In another embodiment the carbon aerogel is an activated carbon aerogel. In one embodiment the oxide is titanium oxide. In another embodiment the oxide is an oxide from transitional metal oxide made with forming precursors of manganese or iron or cobalt or nickel or copper or zinc or zirconium or tin salts or alkoxides.

Nanocarbon-Supported Titanium Dioxide

The present invention in its various embodiments provides the fabrication of new nanocarbon supported titanium dioxide structures that exhibit high surface area and improved electrical conductivity. Nanocarbons consisting of single-walled carbon nanotubes and carbon aerogel nanoparticles were used to support titanium dioxide particles and produce monoliths with densities as low as 80 mg/cm$^3$. The electrical conductivity of the nanocarbon-supported titanium dioxide was dictated by the conductivity of the nanocarbon support while the pore structure was dominated by the titanium dioxide aerogel particles. The conductivity of the monoliths presented here was 0.72 S/cm and the surface area was 203 m$^2$/g.

Titanium dioxide is a widely researched material with applications ranging from photocatalysts to electrodes to hydrogen storage materials. However, issues such as absorption limited to the ultraviolet range, high rates of electron-hole recombination, and relatively low surface areas have limited commercial use of titanium dioxide. Recent efforts have focused on combining titanium dioxide with various materials to address some of these issues. Titanium dioxide in the presence of carbon (e.g. carbon nanotubes (CNT)) is currently one of the most attractive combinations. While recent work has shown some improvements, surfaces areas and photocatalytic activity are still limited. Maintaining high surface areas while improving electrical conductivities, one could envision charging-discharging rates and photoefficiencies that are significantly higher than currently possible. Unfortunately for CNT composites, improvements in electrical conductivity are often not fully realized due to poor dispersion of CNTs in the matrix material, impeding the formation of a conductive network. However, with a mechanically robust, electrically conductive CNT foam, one could imagine simply coating this low-density CNT scaffold with titanium dioxide, yielding conductive nanocarbon-supported titanium dioxide.

Here, Applicants present the synthesis and characterization of such a high-surface area, conductive TiO$_2$/CNT composite. Applicants recently reported the synthesis of a novel CNT-based foam, consisting of bundles of single-walled nanotubes (SWNT) crosslinked by carbon aerogel (CA) nanoparticles, which would serve as an excellent candidate for the CNT scaffold of the TiO$_2$/CNT composite. The SWNT-CA foams simultaneously exhibited increased stiffness, and high electrical conductivity even at densities approaching 10 mg cm$^3$ without reinforcement. The foams are stable to temperatures approaching 1000° C. and have been shown to be unaltered by exposure to extremely low temperatures during immersion in cryogenic liquids. So, in addition to their use in applications such as catalyst supports, sensors, and electrodes, these ultralight, robust foams could allow the formation of novel CNT composites. As the conductive network is already established, it can be impregnated through the wicking process with a matrix of choice, ranging from inorganic sols to polymer melts to ceramic pastes. Thus, a variety of conductive CNT composites could be created using the SWNT-CA foam as a pre-made CNT scaffold. Applicants use the SWNT-CA as a scaffold for the synthesis of conductive, high surface area $TiO_2$/CNT composites.

Experiment

Materials

All reagents were used without further purification. Resorcinol (99%) and formaldehyde (37% in water) were purchased from Aldrich Chemical Co. Sodium carbonate (anhydrous) was purchased from J. T. Baker Chemical Co. Highly purified SWNTs were purchased from Carbon Solutions, Inc.

SWNT-CA preparation. The SWNT-CAs were prepared as described in previous work. Briefly, in a typical reaction, purified SWNTs (Carbon Solutions, Inc.) were suspended in deionized water and thoroughly dispersed using a VWR Scientific Model 75T Aquasonic (sonic power—90 W, frequency—40 kHz). The concentration of SWNTs in the reaction mixture was 0.7 wt %. Once the SWNTs were dispersed, resorcinol (1.235 g, 11.2 mmol), formaldehyde (1.791 g, 22.1 mmol) and sodium carbonate catalyst (5.95 mg, 0.056 mmol) were added to the reaction solution. The resorcinol to catalyst ratios (R/C) employed was 200. The amount of resorcinol and formaldehyde (RF solids) used was 4 wt %. The sol-gel mixture was then transferred to glass molds, sealed and cured in an oven at 85° C. for 72 h. The resulting gels were then removed from the molds and washed with acetone for 72 h to remove all the water from the pores of the gel network. The wet gels were subsequently dried with supercritical $CO^2$ and pyrolyzed at 1050° C. under a N2 atmosphere for 3 h. The SWNT-CAs materials were isolated as black cylindrical monoliths. Foams with SWNT loadings of 30 wt % (0.5 vol %) were prepared by this method.

$TiO_2$/SWNT-CA Composite Preparation

Sol-gel chemistry was used to deposit the TiO, aerogel layer on the inner surfaces of the SWNT-CA support. The $TiO_2$ sol-gel solution was prepared as described in previous work. In a typical synthesis, SWNT-CA parts were immersed in the $TiO_2$ sol-gel solution and full infiltration of the SWNT-CA pore network by the sol-gel solution was achieved under vacuum. Following gelation of the titania network, the wet composite was dried using supercritical $CO_2$, yielding the $TiO_2$/SWNT-CA composite.

$TiO_2$/SWNT-CA Characterization

Bulk densities of the $TiO_2$/SWNT-CA composites were determined from the physical dimensions and mass of each sample. The volume percent of SWNT in each sample was calculated from the initial mass of SWNTs added, assuming a CNT density of 1.3 g/cm$^3$, and the final volume of the aerogel. Scanning electron microscopy (SEM) characterization was performed on a JEOL 7401-F at 10 keV (20 mA) in SEI mode with a working distance of 2 mm. Transmission electron microscopy (TEM) characterization was performed on a JEOL JEM-200CX. Thermogravimetric analysis (TGA) was performed on a Shimadzu TGA 50 Thermogravimetric Analyzer to determine $TiO_2$ content. Samples were heated in flowing air at 10 sccm to 1000° C. at 10° C./min in alumina boats. The weight fraction of material remaining was assumed to be pure stoichiometric $TiO_2$. Energy dispersive spectroscopy confirmed that only TiO, remained after TGA was performed. Surface area determination and pore volume and size analysis were performed by Brunauer-Emmett-Teller (BET) and Barrett-Joyner-Halenda (BJH) methods using an ASAP 2000 Surface Area Analyzer (Micromeritics Instrument Corporation). Samples of approximately 0.1 g were heated to 300° C. under vacuum (10$^{-5}$ Torr) for at least 24 hours to remove all adsorbed species. Electrical conductivity was measured using the four-probe method similar to previous studies. Metal electrodes were attached to the ends of the cylindrical samples. The amount of current transmitted through the sample during measurement was 100 mA and the voltage drop along the sample was measured over distances of 3 to 6 mm. Seven or more measurements were taken on each sample.

Figure 1B:
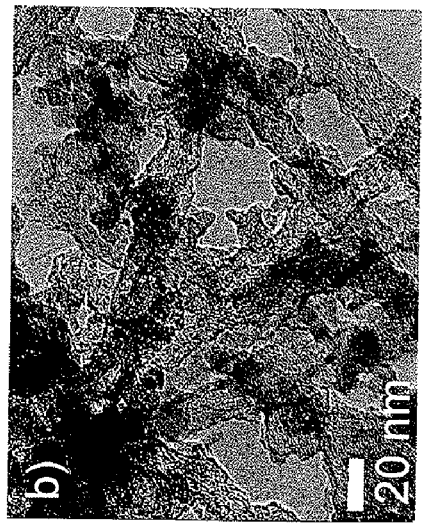

The microstructure of the $TiO_2$/SWNT-CA composites was examined using SEM and TEM. As shown in FIG. 1A and FIG. 1B, the network structure of the $TiO_2$/SWNT-CA composites is similar to that observed in pristine SWNT-CA. The presence of the TiO, aerogel layer on the surface of the nanotube bundles can be seen in TEM image. Interestingly, the $TiO_2$ aerogel appears to have formed primarily on the surfaces of the nanotube bundles despite the fact that the $TiO_2$ sol-gel solution filled the entire pore volume of the support. The open pore volume in the $TiO_2$/SWNT-CA composite is only sparsely populated with $TiO_2$ particles. This observation indicates that nucleation of the $TiO_2$ particles during the sol-gel reaction preferentially occurs at the surface of the nanotube bundles.

Figure 2:
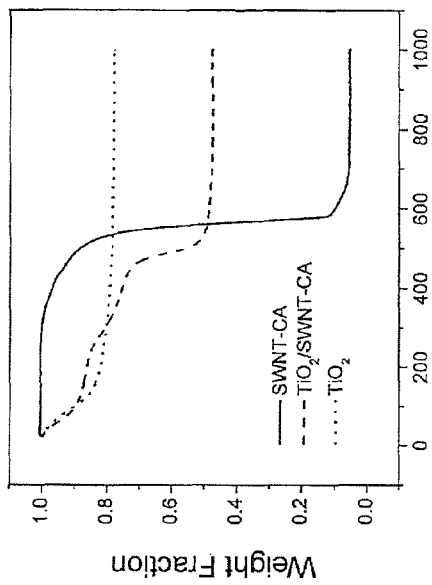
FIG. 2 is a TGA plot of SWNT-CA, TiO$_2$/SWNT-CA, and TiO$_2$ in air.

Thermal gravimetric analysis in air was used to determine the $TiO_2$ content in the as-$TiO_2$/SWNT-CA composites as illustrated in FIG. 2. As expected, combustion of the pristine SWNT-CA occurs around 500° C. and the material is completely consumed by 600° C. The 5 wt % remaining is likely metal catalyst from the CNTs. The titania exhibits an initial mass loss generally attributed to moisture and organics below 300° C. and is stable thereafter. Not surprisingly, the TGA plot for $TiO_2$/SWNT-CA material is a composite of the plots for titania and the SWNT-CA. It is interesting to note that the combustion of the SWNT-CA occurs significantly earlier for the $TiO_2$/SWNT-CA compared to that for the pristine SWNT-CA, which may be the result of a catalytic effect of the titania aerogel particles on carbon oxidation. Nevertheless, the nearly 50 wt % remaining after combustion of the SWNT-CA confirm the presence of titania in the $TiO_2$/SWNT-CA composite.

Figure 3:
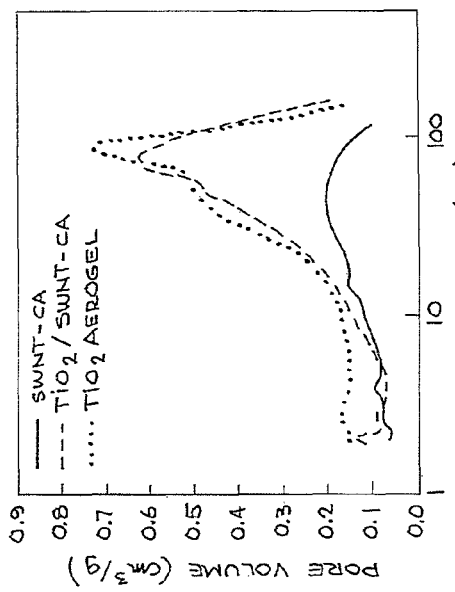
FIG. 3 is Semi-log plot of the pore size distribution of the SWNT-CA, TiO$_2$/SWNT-CA, and TiO$_2$ aerogel.

FIG. 3 plots the pore size distribution of the SWNT-CA, $TiO_2$/SWNT-CA composite, and pristine TiO, aerogel. The BET surface area, electrical conductivity and other physical properties of these materials are summarized in Table 1. Table I shows that the $TiO_2$/SWNT-CA composite has high surface area and electrical conductivity. In fact, the electrical conductivity of the SWNT-CA is not adversely affected by the infiltration of the insulating material. Though, based on the SEM and TEM images (FIG. 1), the titania aerogel appears to simply coat the SWNT-CA scaffold, the increased surface area suggests that the pore morphology of the titania dominates the overall pore morphology of the composite. This is confirmed via the pore size distribution, which shows that the pore size distribution of the $TiO_2$/SWNT-CA is much closer to that of pristine $TiO_2$ aerogel than that of the SWNT-CA. Thus, with the $TiO_2$/SWNT-CA composite, a new class of materials with good electrical conductivity and high surface area are realized.

TABLE 1

Physical Properties of SWNT-CA,
TiO$_2$/SWNT-CA, and TiO$_2$ aerogel.

| Material | CNT, vol % (wt %) | Density, g/cm$^3$ | $S_{BET}$, m$^2$/g | σ, S cm$^{-1}$ |
|---|---|---|---|---|
| SWNT-CA | 0.5 (30) | 0.030 | 184 | 0.77 |
| TiO$_2$/SWNT-CA | 0.5 (8) | 0.082 | 203 | 0.72 |
| TiO$_2$ aerogel | 0 (0) | 0.193 | 237 | <0.001 |

Applicants have described a straightforward method for the fabrication of electrically conductive, high-surface area TiO$_2$/CNT composites. The novel TiO$_2$/SWNT-CA monoliths was prepared by coating the CNT struts within the SWNT-CA scaffold with amorphous sol-gel-derived TiO$_2$ particles. Given the technological interest in crystalline TiO$_2$, one can convert the amorphous TiO$_2$ layer to the anatase crystalline phase. The conductive network of the SWNT-CA scaffold remained intact after infiltration yielding a composite with a conductivity of 0.72 S-cm$^{-1}$ and a surface area of 203 m$^2$/g. Therefore, the SWNT-CAs were shown to provide the means to create conductive, high-surface area TiO$_2$, composites. The general nature of this method should provide a route for the synthesis of a variety of conductive, high surface area composites with applications in photocatalysis and energy storage.

This nanocarbon-supported titanium dioxide example is described in greater detail in the journal article, "Synthesis and Characterization of Nanocarbon-Supported Titanium Dioxide," Author(s): Marcus A Worsley, Joshua D. Kuntz, Octavio Cervantes, T Yong-Jin Han, Peter Pauzauskie, Joe H. Satcher, Theodore F. Baumann, Paper #: 1174-V03-06, DOI: 10.1557/PROC-1174-V03-06, 2010 MRS Spring Meeting, Material Research Society. The journal article "Synthesis and Characterization of Nanocarbon-Supported Titanium Dioxide," by Marcus A. Worsley, Joshua D. Kuntz, Octavio Cervantes, T. Yong-Jin Han, Peter J. Pauzauskie, Joe H. Satcher, Jr. and Theodore F. Baumann, Mater. Res. Soc. Proc. Vol. 1174, (2009) is incorporated herein in its entirety by this reference for all purposes.

Example

High Surface Area Carbon Nanotube-Supported Titanium Carbonitride Aerogels

Porous transition metal nitrides and carbides have received considerable attention recently as catalysts and catalyst supports. They exhibit high resistance to sintering and poisoning, in addition to catalytic activity for a number of useful reactions. Of particular interest is the fact that these transition metal compounds have been shown to have catalytic activity similar to that of typical noble metal catalysts. Thus, substituting transition metal compounds for noble metals is an attractive option for reducing the cost of catalyst materials. Unfortunately, traditional routes to forming metal nitrides and carbides, such as the carbothermal reduction of metal oxides, yield low surface area materials. To increase the specific surface area of transition metal carbides and nitrides, a number of new synthetic methods have been proposed. One promising approach involves the use of high surface area templates or supports to control the microstructure of the transition metal nitride and carbide. For example, both high surface area SiO$_2$ and C$_3$N$_4$ have been used to form TiN powders with surface areas in excess of 100 m$^2$/g. With surface areas as high as 1000 m$^2$/g, carbon nanotubes (CNT) could also serve as such a high surface area support. There have been a number of studies exploring the deposition of various metal oxides on CNTs, however, to our knowledge, only one study examines depositing a transition metal nitride on CNTs. And while the fabrication of metal nitride or carbide nanostructures has received a lot of attention, the use of CNTs for creating high surface area transition metal nitrides or carbides has not been reported.

Here, Applicants report the synthesis and characterization of a monolithic CNT-supported titanium carbonitride aerogel (TiCN/CNT) with surface area in excess of 250 m$^2$/g. This TiCN/CNT was formed by the carbothermal reduction of a TiO$_2$-coated low-density CNT-based foam (TiO$_2$/CNT) in flowing nitrogen. The CNT-based foam (30 wt % CNT, 30 mg cm$^{-3}$) that serves as the support consists of single-walled carbon nanotubes crosslinked by carbon aerogel particles (SWNT-CA), as previously described. To prepare the TiO$_2$/CNT, the SWNT-CA was immersed in a TiO, sol under vacuum prior to gelation, similar to the method previously reported for fabricating stiff, conductive polymer/CNT composites. The TiO$_2$ sol was prepared via a two-step sol-gel process involving the acid-catalyzed hydrolysis of titanium tetraethoxide, followed by base-initiated gelation of the TiO$_2$ species. Briefly, a solution of titanium tetraethoxide (1.0 g, 4.4 mmol) and pure ethanol (4.5 mL) was prepared in an ice bath with vigorous stirring. Once chilled, hydrochloric acid (37%, 71.4 μL) and deionized water (85.7 μL) were then added to the titanium tetraethoxide/ethanol solution. After five minutes of continuous stirring, propylene oxide (0.36 g, 6.1 mmol) was finally added to the reaction mixture. The reaction mixture was stirred for another five minutes before immersing the SWNT-CA monolith in the TiO$_2$ sol. Vacuum was applied to the reaction vessel to ensure complete infiltration of the TiO$_2$ sol in the SWNT-CA. After infiltration, the TiO$_2$ sol was then allowed to gel in the SWNT-CA under ambient conditions. The wet composite gel was then dried using supercritical CO$_2$, yielding the TiO$_2$/CNT. The TiO$_2$/CNT was then heated under flowing nitrogen at 1400° C. for 4 hours to yield the TiCN/CNT monolith.

Powder X-ray diffraction (XRD) analysis of the samples was performed with Cu Kα radiation on a Scintag PAD-V X-ray diffractometer. TiO$_2$ powder was used as a standard. Bulk densities of the monoliths were determined from the physical dimensions and mass of each sample. Scanning electron microscopy (SEM) and energy-dispersive X-ray spectroscopy (EDX) characterization were performed on a JEOL 7401-F at 5-10 keV (20 mA) in SEI mode with a working distance of 2-8 mm. To supplement EDX, thermogravimetric analysis (TGA) was performed on a Shimadzu TGA 50 Thermogravimetric Analyzer. Samples were heated in air to 1000° C. at 10° C./min in alumina boats. Transmission electron microscopy (TEM) characterization was performed on a JEOL JEM-200CX Electron Microscope operated at 200 kV. Samples for TEM were prepared by pulverizing aerogels above TEM grids. Surface area determination and pore volume and size analysis were performed by Brunauer-Emmett-Teller (BET) and Barrett-Joyner-Halenda (BJH) methods using an ASAP 2000 Surface Area Analyzer (Micromeritics Instrument Corporation). Samples of approximately 0.1 g were heated to 300° C. under vacuum (10$^{-5}$ Torr) for at least 24 hours to remove all adsorbed species prior to analysis. Electrical conductivity was measured using the four-probe method similar to previous studies. Metal electrodes were attached to the ends of cylindrical samples. The amount of current transmitted through the sample during measurement was 100 rnA, and the voltage drop along the sample was measured over distances of 3 to 6 mm.

Figure 4B:
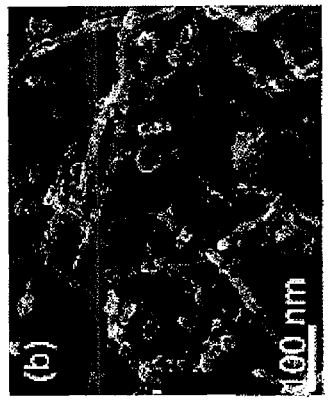
FIGS. 4A-D are SEM images of TiO$_2$/CNT (a, b) and TiCN/CNT (c, d) at different magnifications.
Figure 4D:
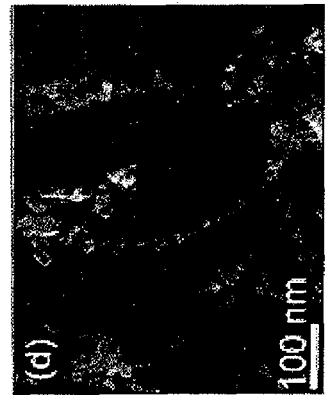
Figure 4A:
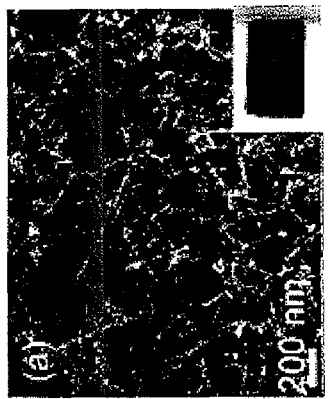
Figure 4C:
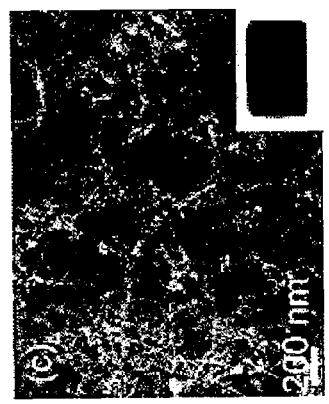
Figure 5A:
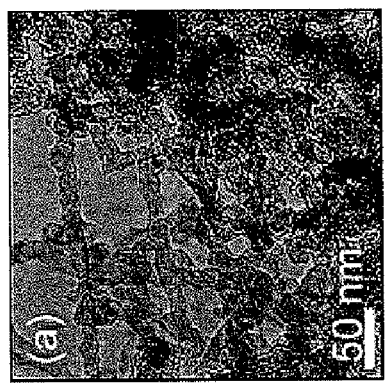
FIGS. 5A and 5B are TEM images of TiO$_2$/CNT and (b) TiCNT/CNT.
Figure 5B:
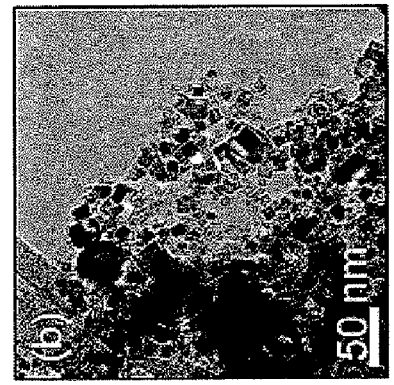

SEM images of the TiO$_2$/CNT, FIG. 4A and FIG. 4B and TiCN/CNT) FIG. 4C and FIG. 4D show the ligament and pore structure of these materials. The TiO$_2$/CNT resembles the CNT-based foam except for the coating of amorphous TiO$_2$. The TEM image of the TiO$_2$/CNT, FIG. 2A supports this view. The TiCN/CNT also has the same basic structure as the original CNT-based foam except that the ligaments are now decorated with TiCN nanocrystals FIGS. 4B and 4C. This observation suggests that the carbon consumed during the reduction of TiO, comes primarily from the carbon aerogel coating the CNT bundles, leaving the CNTs intact. The integrity of the CNTs was also confirmed via Raman spectroscopy through observation of the peaks characteristic of CNTs (ESI1) in the TiCN/CNT. The TEM image, FIG. 2B, also shows that the TiCN/CNT ligaments, on average, have smaller diameters than the TiO$_2$/CNT. The smaller diameters probably occur as the TiO, is reduced and carbon aerogel is consumed in the course of forming the TiCN nanocrystals. The TiCN/CNT had a brownish color compared to the jet-black CNT-based foam and TiO$_2$/CNT.

TABLE II

Density ($\rho$), electrical conductivity ($\sigma$), and elemental content (Ti, C, N, O) of the composite foams

| Material | $\rho$, g cm$^{-3}$ | $\sigma$, S cm$^{-1}$ | Ti, at % (wt %) | C, at % (wt %) | N, at % (wt %) | O, at % (wt %) |
|---|---|---|---|---|---|---|
| CNT-based foam | 0.030 | 0.77 | — | 95 (93) | — | 5.0 (6.6) |
| TiO$_2$/CNT | 0.082 | 0.72 | 9.4 (28) | 71 (53) | — | 19 (19) |
| TiCN/CNT | 0.055 | 0.25 | 17 (43) | 65 (43) | 18 (14) | <1 (<1) |

Table II summarizes some basic properties of the TiCN/CNT, as well as the CNT-based foam and the TiO$_2$/CNT. The density of the TiCN/CNT is significantly reduced compared to the TiO$_2$/CNT. During the carbothermal reduction, the monolith experienced 49% mass loss and 28% volume shrinkage, resulting in the 55 mg cm$^{-3}$ final density. The electrical conductivity of the TiCN/CNT is diminished compared to the CNT-based foam and TiO$_2$/CNT, but still high considering the extremely low bulk density of the TiCN/CNT foam. The partial consumption during the heat treatment of the graphitic carbon aerogel particles that crosslink the CNT bundles, is likely the cause of the decreased conductivity. Interfacial resistance has been shown to be a dominant factor in the transport properties of CNT composites. The removal or narrowing of the critical conduction pathways between CNT bundles effectively increases the interfacial resistance, leading to a decrease in the bulk conductivity.

Elemental analysis by EDX and TGA suggests that the TiO$_2$, in the TiO$_2$,/CNT is completely converted to TiCN in the TiCN/CNT. This observation is consistent with literature on the carbothermal reduction of TiO, under the conditions of this study. Under a constant supply of nitrogen and excess carbon, it is expected that 100% reduction should occur, assuming temperature and time are chosen appropriately. Previous studies have shown 100% reduction at temperatures as low as 1300 DC for a 4 hour hold time. The roughly 1:1 Ti:N ratio suggests a fairly N-rich TiCN phase was formed. EDX elemental mapping (ESI) shows an even distribution of elements indicative of a TiCN layer that covers most of the CNT surface. XRD analysis offers more details concerning the composition of the TiCN phase.

Powder XRD was used to determine what phases were present in the TiCN/CNT. For reference, XRD patterns of the CNT-based foam and TiO$_2$/CNT were also included. The largest peaks from the CNT-based foam can be attributed to the (100) and (101) graphite peaks (PDF #41-1487). These peaks are also visible in the pattern from the TiO$_2$/CNT. The absence of additional peaks in the TiO$_2$/CNT pattern supports the earlier suggestion that the TiO$_2$ coating the CNT ligaments is amorphous. The XRD peaks for the TiCN/CNT would indicate the presence of the osbornite crystalline phase of TiCN (PDF #06-642). The calculated lattice parameter, a, for the TiCN/CNT, 4.244 Å, is in good agreement with TiC$_{1-x}$N$_x$ (x=0.95) and very close to the value for pure TiN, 4.240. Peak broadening indicates that the average crystallite size is about 20 nm, consistent with the particle sizes observed in SEM and TEM analysis and. Therefore, based on the XRD data, a highly nitrogen-enriched layer of TiCN nanocrystals covers the CNT bundles.

Nitrogen adsorption/desorption analysis was performed to determine surface area, pore volume and average pore size of the TiCN/CNT. All three samples had Type IV nitrogen isotherms (ESI), indicative of the predominantly macroporous nature of the CNT-based foam that serves as the foundation for all the samples. The addition of TiO$_2$ and the conversion to TiCN increased both the surface area and pore volume of the composite foams. Peak pore size increases from 56 nm in the CNT-based foam to 72 nm in the TiO$_2$/CNT and TiCN/CNT. The TiO$_2$/CNT exhibits pore morphology similar to that of an amorphous TiO$_2$ aerogel, suggesting that the TiO$_2$ coating the CNT bundles dominates the nitrogen sorption behavior. The TiCN/CNT maintains the same general morphology as the TiO$_2$/CNT, as evidenced by a similar pore size distribution. However, the surface area and pore volume are increased because of the decreased bulk density and additional porosity due to removal of carbon (in the form of gaseous CO) that occurs during carbothermal reduction. Similar increases in surface area were observed by Berger et al. under similar conditions during the conversion of TiO$_2$ (rutile) and carbon (furnace black or graphite).

In summary, the synthesis of high surface area TiCN/CNT has been shown by the carbothermal reduction of TiO$_2$ in a CNT-based foam. The resulting monolith was conductive, contained N-rich TiCN nanocrystals decorating CNT bundles and had a surface area of 276 m$^2$/g. The straightforward nature of this method should allow for the synthesis of other high surface area CNT-supported metal nitrides (e.g. ZrN, Si$_3$N$_4$) by simply reducing the respective oxide (e.g. ZrO$_2$, SiO$_2$). Also, by performing the carbothermal reduction in inert gas (e.g. Ar), high surface area carbides (e.g. TiC, SiC) could also be formed. Thus, a new class of monolithic, high surface area CNT-supported carbides and nitrides could be developed with potential for significant contributions in applications such as catalysis.

This high surface area carbon nanotube-supported titanium carbonitride aerogels example is described in greater detail in the journal article "High surface area carbon nanotube-supported titanium carbonitride aerogels," by Marcus A. Worsley, Joshua D. Kuntz, Peter J. Pauzauskie, Octavio Cervantes, Joseph M. Zaug, Alex E. Gash, Joe H. Satcher Jr., and Theodore F. Baumann, *Journal of Materials Chemistry*, 2009, 19, 5503-5506, which is incorporated herein in its entirety by this reference for all purposes.

Example

High Surface Area TiO$_2$/C and TiCN/C Composites

Nanocomposites of titania and various forms of carbon (i.e. carbon nanotubes, activated carbons, ordered carbons, etc.) exhibit a number of enhanced functional properties for catalysis and energy-storage applications. Several reports have shown that titania/carbon ($TiO_2/C$) composites have higher photocatalytic activity, improved photoefficiency, and a wider absorption band than titania alone. Composites of $TiO_2/C$ have also been shown to improve the energy and power density of electrochemical cells and enhance the storage capacity and reversibility of hydrogen-storage materials. The efficacy of these composite materials depends mainly on the crystallinity and surface area of the titania species. As a result, significant efforts have been focused on the design of high surface area composites containing either rutile or anatase $TiO_2$. One approach to the fabrication of these composites has been the incorporation of the titania within high surface area supports or scaffolds. While this approach has generated a variety of novel titania composites, the surface areas of the composites are typically lower than those of the scaffolds themselves. The decrease in surface area is generally attributed to blocking of the micropores in the support by the deposited titania, decreasing the accessible surface area. The design of a high surface area support containing bimodal porosity (macro- and micropores) could limit the detrimental effects associated with pore-plugging, thereby providing a route to a new class of high surface area titania composites.

Applicants recently reported the synthesis of activated carbon aerogel (ACA) monoliths that exhibited hierarchical porosity and surface areas in excess of 3000 $m^2 g^{-1}$. Applicants use these materials as scaffolds for the synthesis of high surface area titania and titanium carbonitride (TiCN) composites. The composites are prepared through coating the inner surfaces of monolithic ACA templates with a layer of sol-gel-derived titania, yielding the $TiO_2/ACA$ composite. In a typical synthesis, ACA parts were immersed in the $TiO_2$ sol-gel solution and full infiltration of the ACA pore network by the sol-gel solution was achieved under vacuum. After drying, the amorphous $TiO_2$ overcoat in the composite can then be converted to either anatase $TiO_2$ or titanium carbonitride through heat treatment under different conditions. To convert the amorphous $TiO_2$ layer to anatase, the as-prepared $TiO_2/ACA$ part was heated in air at 400° C. for 2 hours. Alternatively, to prepare the TiCN-coated ACA composite, the as-prepared $TiO_2/ACA$ part was heated under flowing nitrogen at 1400° C. for 4 hours. In both cases, the heat-treated composite materials exhibit extremely high BET surface areas (>1800 $m^2 g^{-1}$) and retain the porous network structure of the monolithic ACA support. Because of the technological importance of titania and its well-documented conversion to $TiC_{1-x}N_x$ (0<x<1) via carbothermal reduction, these systems were chosen to demonstrate the potential of the ACA as a scaffolding material. Nevertheless, the approach described here is general and can be applied to the fabrication of other high surface area metal oxide, metal nitride and metal carbide composites of interest.

Figure 7C:
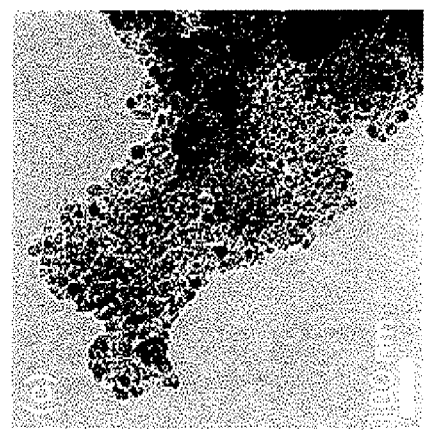
FIGS. 7A-C are transmission electron microscopy images of as-prepared TiO$_2$/ACA (a), heat-treated TiO$_2$/ACA (b), and TiCN/ACA (c).
Figure 7A:
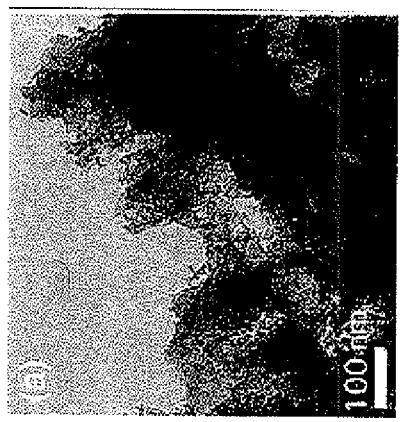
Figure 7B:
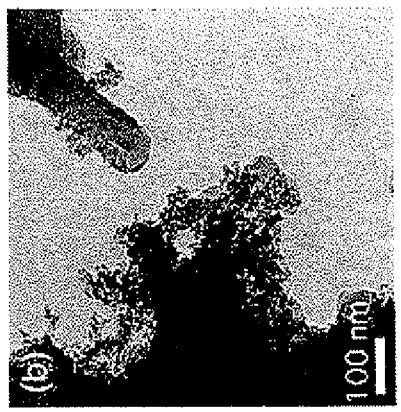

The microstructures of the titania-ACA composites were evaluated using scanning electron microscopy FIGS. 6A-D and transmission electron microscopy FIGS. 7A-C. SEM images of as-prepared $TiO_2/ACA$ FIGS. 6C-D show the same trabecular structure and texture as observed in the pristine ACA FIGS. 6A-B. The presence of the $TiO_2$ aerogel layer on the surface of the ACA can be seen in images of the as-prepared $TiO_2/ACA$ composites. Interestingly, the $TiO_2$ aerogel appears to have formed primarily on the surfaces of the ACA despite the fact that the $TiO_2$ sol-gel solution filled the entire pore volume of the support. As seen in FIGS. 7C-D and FIG. 7A, the open pore volume in the ACA composite is only sparsely populated with $TiO_2$ particles. This observation indicates that nucleation of the $TiO_2$ particles during the sol-gel reaction preferentially occurs at the surface of the ACA. After heat treatment at 400° C., the texture of the $TiO_2/ACA$ composite appears to roughen, apparently due to the formation of anatase TiO2 nanocrystals on the ACA surface FIGS. 6E-F and FIG. 7C. Further changes in texture are seen after carbothermal reduction of the surface layer of TiO2 to TiCN FIGS. 6G-H and FIG. 7C. In the TiCN/ACA composite, cubic TiCN crystals ranging in size from 10 to 100 nm are clearly visible on the ACA surface. The continuous nature of the crystalline TiCN layer suggests that the deposited TiO2 completely coated the entire surface of the ACA support. With the bulk of the TiO2 deposited at the ACA surface, the number of TiO2 particles formed in sol filling the free space in the ACA is greatly reduced.

Thermal gravimetric analysis in air was used to determine the TiO2 content in the as-prepared and annealed TiO2/ACA composites as well as the TiCN content in the TiCN/ACA composite. As expected, combustion of the pristine ACA composite begins oxidizing at 400° C. and the material is completely consumed by 600° C. The onset of mass loss for the annealed TiO2/ACA composite is similar to that of the ACA, but the material retains 20% of its original mass due to the presence of the TiO2 overcoat Table III. In contrast to the ACA and TiO2/ACA materials, the TiCN/ACA composite exhibits a slight weight gain at about 350° C. prior to combustion of the carbon support. The increase in mass can be attributed to oxidation of the TiCN layer (molecular weight of 60-62) to TiO2 (molecular weight of 80). Interestingly, complete oxidation of the ACA support in the TiCN/ACA composite does not occur until 680° C. as compared to 600° C. for the other samples, suggesting that the TiCN completely covers the ACA surface, providing an effective barrier to oxygen diffusion. In addition, the energy dispersive X-ray spectroscopy (EDX) element mapping of the TiCN/ACA shows an even distribution of Ti, C, and N, consistent with a TiCN layer covering most of the ACA, as observed in the SEM and TEM images. Only after the TiCN is converted to the oxide does combustion of the ACA occur. The remaining 18 wt % TiO2 from combustion of the TiCN/ACA composite implies a starting TiCN content of 14 wt %.

TABLE III

Physical properties for the ACA support, $TiO_2$ aerogels and the ACA composites

| Material | $TiO_2$/ wt % | Monolithic density/g $cm^{-3}$ | $S_{BET}$/ $m^2 g^{-1}$ | $V_{total}$/ $cm^3 g^{-1}$ | $V_{micro}$/ $cm^3 g^{-1}$ |
|---|---|---|---|---|---|
| ACA | 0 | 0.140 | 2455 | 1.05 | 0.42 |
| $TiO_2$ aerogel (as prepared) | 78 | 0.193 | 237 | 0.53 | — |
| $TiO_2$ aerogel (heat-treated) | 99 | n.a.[a] | 141 | 0.33 | — |
| $TiO_2$/ACA (as-prepared) | 15 | 0.230 | 1507 | 0.91 | 0.50 |
| $TiO_2$/ACA (heat-treated) | 20 | 0.104 | 2054 | 1.30 | 0.61 |
| TiCN/ACA | 14[b] | 0.148 | 1838 | 1.01 | 0.43 |

[a]The heat-treated $TiO_2$ aerogel was isolated as a powder.
[b]TiCN content shown for TiCN/ACA.

Powder XRD was used to determine the crystalline phases of the heat-treated $TiO_2/ACA$ and TiCN/ACA composites. For comparison, the XRD pattern of the ACA was also included. The XRD pattern for the as-prepared $TiO_2/ACA$ (no heat treatment) was very similar to that of the ACA, likely due to the amorphous nature of the titania, and is, therefore, not shown. The largest peaks in the diffraction pattern for the ACA material can be attributed to the (100) and (101) graphite peaks (PDF #41-1487). These peaks are also visible in the diffraction patterns for the heat-treated TiO$_2$/ACA and TiCN/ACA composites due to the presence of the ACA support. The remaining peaks in the XRD pattern for the annealed TiO$_2$/ACA composite can be indexed to the anatase phase of TiO2 (PDF #21-1272). Analysis of the peaks using the Scherrer equation indicates the average crystallite size is about 9 nm, in agreement with the small size of the crystals observed by electron microscopy. The XRD peaks for the TiCN/ACA composite indicate the presence of the osbornite crystalline phase of TiCN (PDF #06-0642) on the ACA support. The calculated lattice parameter, a, for the TiCN in the TiCN/ACA, 4.248 Å, is in good agreement with TiC$_{1-x}$N$_x$ (x=0.90) and very close to the value for pure TiN, 4.240. The high nitrogen content is consistent with EDX results showing a Ti:N ratio of close to one. The average crystallites size calculated from the XRD data (about 20 nm) correlates with the size range of the cubic crystals observed in SEM and TEM analysis. Therefore, based on the XRD data, the heat-treated TiO$_2$/ACA composite contained purely anatase nanocrystals, and full reduction of TiO$_2$ to TiCN was achieved in the TiCN/ACA composite to create a highly nitrogen-enriched layer of TiCN nanocrystals on the ACA surface.

The textural properties of the TiO$_2$/ACA and TiCN/ACA composites were evaluated using nitrogen adsorption/desorption analysis Table III. For comparison, data for the ACA and TiO$_2$ aerogel (before and after heat treatment) are also included in Table III. Nitrogen adsorption/desorption plots for the ACA and the composites. Each of the composites exhibited type II nitrogen isotherms, indicating a mostly macroporous (<2 nm) material with the remaining pore volume primarily in the large meso- and macropore (>90 nm) range. Coating of the ACA framework with TiO2 clearly results in a significant decrease in BET surface area (1507 m$^2$ g$^{-1}$) relative to the uncoated ACA. Nevertheless, the surface area of the as-prepared TiO$_2$/ACA composite represents almost an order of magnitude improvement over that of the as-prepared TiO2 aerogel. Retention of such a large BET surface area in the coated material suggests that the ACA is less susceptible to the negative effects of pore-plugging observed in other scaffold materials, such as activated carbons. Additionally, heat treatment of the as-prepared TiO$_2$/ACA leads to a 36% increase in surface area in the annealed composite (2054 m$^2$ g$^{-1}$). This observation is in contrast to the sharp decrease in surface area that occurs upon annealing of the bulk TiO$_2$ aerogel prepared without the scaffold. The increased surface area and pore volume in the annealed composite indicate that the ACA support prevents coarsening and collapse of the TiO$_2$ coating during heat treatment, even as the amorphous titania is converted to the anatase phase. The presence of high-surface area SiO$_2$ has been shown to have similar effects on the temperature stability of pores in TiO$_2$ gels. In addition, correspondingly lower density of the annealed TiO2/ACA (relative to as-prepared TiO$_2$/ACA) is consistent with a lack of pore collapse and likely contributes to the observed textural properties. Similarly, the TiCN/ACA composite also exhibits increased surface area and pore volume relative to the as-prepared TiO$_2$/ACA composite Table III. The increased surface area can be attributed to the additional porosity created by the removal of carbon from the ACA support (in the form of gaseous CO) that occurs during carbothermal reduction. Similar increases in surface area have been reported under similar conditions during the conversion of TiO$_2$ (rutile) and carbon (furnace black or graphite) mixtures to TiCN. While the surface area and pore volume for the TiCN/ACA composite are slightly lower than those of the heat-treated TiO$_2$/ACA, the textural properties are still quite close to those of the original ACA. This observation demonstrates the flexibility of the ACA scaffold for creating a variety of high surface area oxide, carbide and nitride materials.

In a typical synthesis, titanium(IV) ethoxide (1 g, 0.0125 mol) and ethanol (3.57 g, 0.0776 mol), hydrochloric acid (71.4 µL), and water (851 µL) were mixed in an ice bath, followed by the addition of propylene oxide (0.357 g, 0.00616 mol) to prepare the titania sol. An activated carbon aerogel monolith was immersed in the titania sol in a glass vial and held under vacuum to ensure full penetration of the sol in the carbon aerogel. The reaction mixture was then cured at room temperature for 24 h. The wet composite was washed in ethanol and dried by supercritical extraction in CO2 to yield the TiO$_2$/ACA composite Annealing the as-prepared TiO$_2$/ACA composite in air at 400° C. for 2 h was required to convert the amorphous titania layer on the ACA to the anatase phase. Alternatively, heating the as-prepared TiO$_2$/ACA composite in flowing nitrogen at 1400° C. for 4 h produced the TiCN/ACA composite.

Powder X-ray diffraction (XRD) analysis of the samples was performed with Cu Kα radiation on a Scintag PAD-V X-ray diffractometer. TiO$_2$ (anatase) powder was used as a standard. Bulk densities of the monoliths were determined from the physical dimensions and mass of each sample. Scanning electron microscopy (SEM) and energy-dispersive X-ray spectroscopy (EDX) characterization was performed on a JEOL 7401-F at 5-10 keV (20 mA) in SEI mode with a working distance of 2-8 mm. Transmission electron microscopy (TEM) characterization was performed on a JEOL JEM-200CX electron microscope operated at 200 kV. Thermogravimetric analysis (TGA) was performed on a Shimadzu TGA 50 thermogravimetric analyzer to determine TiO2 and TiCN contents. Samples were heated in flowing air at 10 sccm to 1000° C. at 10° C. min$^{-1}$ in alumina boats. The weight fraction of material remaining was assumed to be pure stoichiometric TiO$_2$. The TiCN content of the TiCN/ACA was calculated from the weight fraction of TiO2 remaining after heating to 1000° C. in air assuming full oxidation of initial TiCN content. Energy dispersive spectroscopy confirmed that only TiO$_2$ remained after TGA was performed. Surface area determination and pore volume analysis were performed by Brunauer-Emmett-Teller (BET) and Barrett-Joyner-Halenda (BJH) methods using an ASAP 2000 surface area analyzer (Micromeritics Instrument Corporation). Samples of approximately 0.1 g were heated to 300° C. under vacuum ($10^{-5}$ Torr) for at least 24 h to remove all adsorbed species, prior to analysis.

The synthesis and characterization of TiO$_2$/ACA and TiCN/ACA composites with the highest surfaces areas yet reported has been described. The flexibility of the described method should allow for synthesis of other high surface area metal oxides, carbides, and nitrides through the use of supports with bimodal porosity, like the ACA, to minimize pore-plugging effects. This new class of high-surface area materials should be especially advantageous in technologies such as catalysis and energy storage where high surface area and accessible pore volume are desired.

This high surface area TiO$_2$/C and TiCN/C composites example is described in greater detail in the journal article "high surface area TiO$_2$/C and TiCN/C composites," by Marcus A. Worsley, Joshua D. Kuntz, Octavio Cervantes, T. Yong-Jin Han, Alex E. Gash, Joe H. Satcher, Jr and Theodore F. Baumann, *Journal of Materials Chemistry*, 2009, 19, 7146-7150, which is incorporated herein in its entirety by this reference for all purposes.

SiO$_2$/ACA and SiC/ACA Composites

Other embodiments described herein provide a silicon oxide-carbon composite that includes a carbon aerogel with an oxide overcoat, for example a silicon oxide overcoat. Other embodiments described herein provide a silicon carbide-carbon composite that includes a carbon aerogel with a carbide overcoat, for example a silicon carbide overcoat. The silicon carbide-carbon composite is made by providing a carbon aerogel, immersing the carbon aerogel in a silicon oxide sol under a vacuum, returning the carbon aerogel with the silicon oxide sol to atmospheric pressure, curing the carbon aerogel with the silicon oxide sol-gel at room temperature to produce a silicon oxide-carbon wet gel composite, and drying the silicon oxide-carbon wet gel composite to produce the silicon oxide-carbon aerogel composite. The silicon oxide-carbon aerogel composite can then be heated, for example at a temperature of 1500° C. in argon to reduce the silicon oxide to silicon carbide.

The synthesis and characterization of high surface area carbon-supported silica and silicon carbide aerogels are described.

An activated carbon aerogel with surface area greater than 3000 m$^2$/g was used to as a support for the sol-gel deposition of silica. The resulting silica-coated carbon aerogel retained a surface area greater than 2000 m$^2$/g and showed improved thermal stability in air. The carbon-supported silicon carbide aerogel was made by the carbothermal reduction of the silica-coated carbon aerogel under flowing Ar at 1500° C. The resulting monolith maintained a surface area greater than 2000 m$^2$/g and was stable to temperatures approaching 600° C. over 100° C. higher than that of the pristine carbon aerogel.

The microstructures of the SiO$_2$/ACA and SiC/ACA composites were evaluated using scanning electron microscopy as shown in FIGS. 8A-D. SEM images of as-prepared SiO$_2$/ACA (FIG. 8A-B) show the same trabecular structure and texture as observed in pristine ACA. The presence of the SiO$_2$ aerogel layer on the surface of the ACA can be seen in images of the as-prepared SiO$_2$/ACA composites. Interestingly, the SiO$_2$ aerogel appears to have formed primarily on the surfaces of the ACA despite the fact that the SiO$_2$ sol-gel solution filled the entire pore volume of the support. As seen in FIGS. 8A-B, the open pore volume in the ACA composite is only sparsely populated with SiO$_2$ particles. This observation indicates that nucleation of the SiO$_2$ particles during the sol-gel reaction described above preferentially occurs at the surface of the ACA. Further changes in texture are seen after carbothermal reduction of the surface layer of the SiO$_2$ to SiC (FIGS. 8C and 8D). In the SiC/ACA composite, virtually no particles are visible in the open pore volume. In fact, the SiC/ACA appears to have the same texture as the pristine ACA, suggesting the SiC forms a fairly conformal layer on the ACA.

Energy dispersive x-ray analysis was used to track the composition change of the composite during the carbothermal reduction. Oxygen atomic content was used to determine the level of reduction as the SiO$_2$/ACA was populated with SiO$_2$ particles. This observation indicates that nucleation of the SiO$_2$ particles during the sol-gel reaction preferentially occurs at the surface of the ACA. Further changes in texture are seen after carbothermal reduction of the surface layer of SiO$_2$ to SiC (FIG. 8A-D). In the SiC/ACA composite, virtually no particles are visible in the open pore volume. The SiC/ACA composite comprises virtually no particles in the open pore volume, appearing to have the same texture as pristine ACA. Similar results were observed in the case of TiO$_2$ and TiCN on ACA as described above.

The carbothermal reduction was considered complete when the O content in the solid phase is reduced to zero. At 1500° C. the O content drops from 12% to 3% within the first 10 minutes suggesting formation of an Si$_x$O$_y$C phase. The Si and C content show corresponding increases during this initial period. The O content then slowly decreases to zero over the next 5 h. The Si and C content remain fairly constant. Based on these results, it was concluded that a 5 h treatment at 1500° C. was sufficient to completely convert the SiO$_2$ layer in the SiO2/ACA to SiC. This is consistent with literature on SiC synthesis.

Powder XRD was used to confirm the presence of SiC in the SiC/ACA composite. For comparison, the XRD pattern of the as-prepared SiO$_2$/ACA was also included. The XRD pattern for the pristine ACA is identical to that of the SiO$_2$/ACA, due to the amorphous nature of the as-prepared silica, and is, therefore, not shown. The largest peaks in the diffraction pattern for the SiO$_2$/ACA material can be attributed to the (100) and (101) graphite peaks. These peaks are also visible in the diffraction pattern for the SiC/ACA composites due to the presence of the ACA support. The remaining peaks in the XRD pattern for the SiC/ACA composite can be indexed to moissanite SiC. Analysis of the peaks using the Scherrer equation indicates the average crystallite size is ~26 nm. Therefore, based on the XRD and EDX data, full reduction of SiO$_2$ to SiC was achieved in the SiC/ACA composite to create a layer of SiC nanocrystals on the ACA surface.

Thermal gravimetric analysis in air was used to determine the thermal stability of the SiO$_2$/ACA and SiC/ACA, as well as the SiO$_2$ and SiC content. As expected, combustion of the pristine ACA begins at 400° C. and the material is completely consumed by 600° C. The mass loss event below 200° C. for the SiO$_2$/ACA is due to organic impurities from the as-prepared SiO$_2$. The onset of ACA mass loss for the SiO$_2$/ACA composite is ~100° C. higher than that of the pristine ACA, suggesting that the SiO$_2$ covers the ACA surface fairly well and forms a decent barrier to oxygen diffusion. Similar improvements in thermal stability were noted with a TiCN/ACA. In the case of TiCN/ACA, the TiCN was completely oxidized to TiO$_2$ in the process, in contrast to the SiO$_2$ in the SiO$_2$/ACA. For the SiO$_2$/ACA, complete oxidation of the ACA occurs at 690° C. This material retains 15% of its original mass due to the presence of the SiO$_2$ overcoat. Further improvements in thermal stability are observed in the SiC/ACA composite. Mass loss does not begin until close to 600° C. and complete oxidation of the carbon support does not occur until 720° C. Like the SiO$_2$/ACA, this improved thermal stability suggests that the SiC completely covers the ACA surface, providing an effective barrier to oxygen diffusion. The remaining 10% material remaining represents oxidation-resistant SiC.

The textural properties of the SiO$_2$/ACA and SiC/ACA composites were evaluated using nitrogen adsorption/desorption analysis (Table IV). Each of the composites exhibited type II nitrogen isotherms, indicating a mostly microporous <2 nm) material with the remaining pore volume primarily in the large meso- and macropore (>90 nm) range. Coating of the ACA framework with SiO$_2$ clearly results in a significant decrease in BET surface area (2288 m$^2$/g) relative to the uncoated ACA. Nevertheless, the surface area of the as-prepared SiO$_2$/ACA composite represents almost an order of magnitude improvement over that of the as-prepared SiO$_2$ aerogel. Retention of such a large BET surface area in the coated material suggests that the ACA is less susceptible to the negative effects of pore-plugging observed in other scaffold materials, such as activated carbons.

TABLE IV

| Material | SiO$_2$ wt % | Monolithic Density g/cm$^3$ | S$_{BET}$, m$^2$/g | V$_{total}$ cm$^3$/g | V$_{micro}$, cm$^3$/g |
|---|---|---|---|---|---|
| ACA | 0 | 0.083 | 3289 | 1.61 | 0.85 |
| SiO$_2$ aerogel | 91 | 0.120 | 350 | 0.98 | — |
| SiO$_2$/ACA | 15 | 0.147 | 2288 | 1.34 | 0.80 |
| SiC/ACA | 10$^a$ | 0.087 | 2156 | 1.15 | 0.78 |

$^a$SiC content shown for SiC/ACA

After carbothermal reduction, the textural properties show little change. There is small loss of surface area and pore volume, likely due to sintering that occurs during the reduction process. While the surface area and pore volume for the SiC/ACA composite are slightly lower than those of the heat-treated SiO$_2$/ACA, the textural properties are still quite close to those of the original ACA. This observation demonstrates the effectiveness of the ACA scaffold for creating high surface area oxide and carbide materials.

In a typical synthesis, trimethoxysilane (IV) ethoxide (4.1 g) and methanol (14 g), ammonium hydroxide (200 ml), and water (1.5 g) were mixed to prepare a silica sol. An activated carbon aerogel (ACA) monolith with surface area greater than 3000 m$^2$/g was immersed in the silica sol in a glass vial and held under vacuum to ensure full penetration of the sol in the carbon aerogel. The reaction mixture was then cured at room temperature for 24 h. The wet composite was washed in ethanol and dried by supercritical extraction in CO$_2$ to yield an SiO$_2$/ACA composite. Heating the as-prepared SiO$_2$/ACA composite in flowing argon at 1500° C. for about five hours produced an SiC/ACA composite. While not bound to a particular mechanism, it is believed that the carbon-supported silicon carbide aerogel was made by the carbothermal reduction of the silica-coated carbon aerogel.

Powder x-ray diffraction (XRD) analysis of the samples was performed with Cu K, radiation on a Scintag PAD-V X-ray diffractometer. TiO$_2$(anatase) powder was used as a standard. Bulk densities of the monoliths were determined from the physical dimensions and mass of each sample. Scanning electron microscopy (SEM) and energy-dispersive x-ray spectroscopy (EDX) characterization was performed on a JEOL 7401-F at 5-10 keV (20 mA) in SEI mode with a working distance of 2-8 mm. Transmission electron microscopy (TEM) characterization was performed on a JEOL JEM-200CX Electron Microscope operated at 200 kV. Thermogravimetric analysis (TGA) was performed on a Shimadzu TGA 50 Thermogravimetric Analyzer to determine SiO$_2$ and SiC content. Samples were heated in flowing air at 10 sccm to 1000° C. at 10° C./min in alumina boats. The weight fraction of material remaining was assumed to be pure stoichiometric SiO$_2$ and SiC. Surface area determination and pore volume analysis were performed by Brunauer-Emmett-Teller (BET) and Barrett-Joyner-Halenda (BJH) methods using an ASAP 2000 Surface Area Analyzer (Micromeritics Instrument Corporation). 42 Samples of approximately 0.1 g were heated to 300° C. under vacuum (10$^{-5}$ Torr) for at least 24 h to remove all adsorbed species, prior to analysis.

The synthesis and characterization of SiO$_2$/ACA and SiC/ACA composites with the highest surfaces areas yet reported has been described. The flexibility of the described method should allow for synthesis of other high surface area metal oxides, carbides, and nitrides through the use of supports with bimodal porosity, like the ACA, to minimize pore-plugging effects. This new class of high-surface area materials should be especially advantageous in technologies such as catalysis and energy storage where high surface area and accessible pore volume are desired.

Figure 9A:
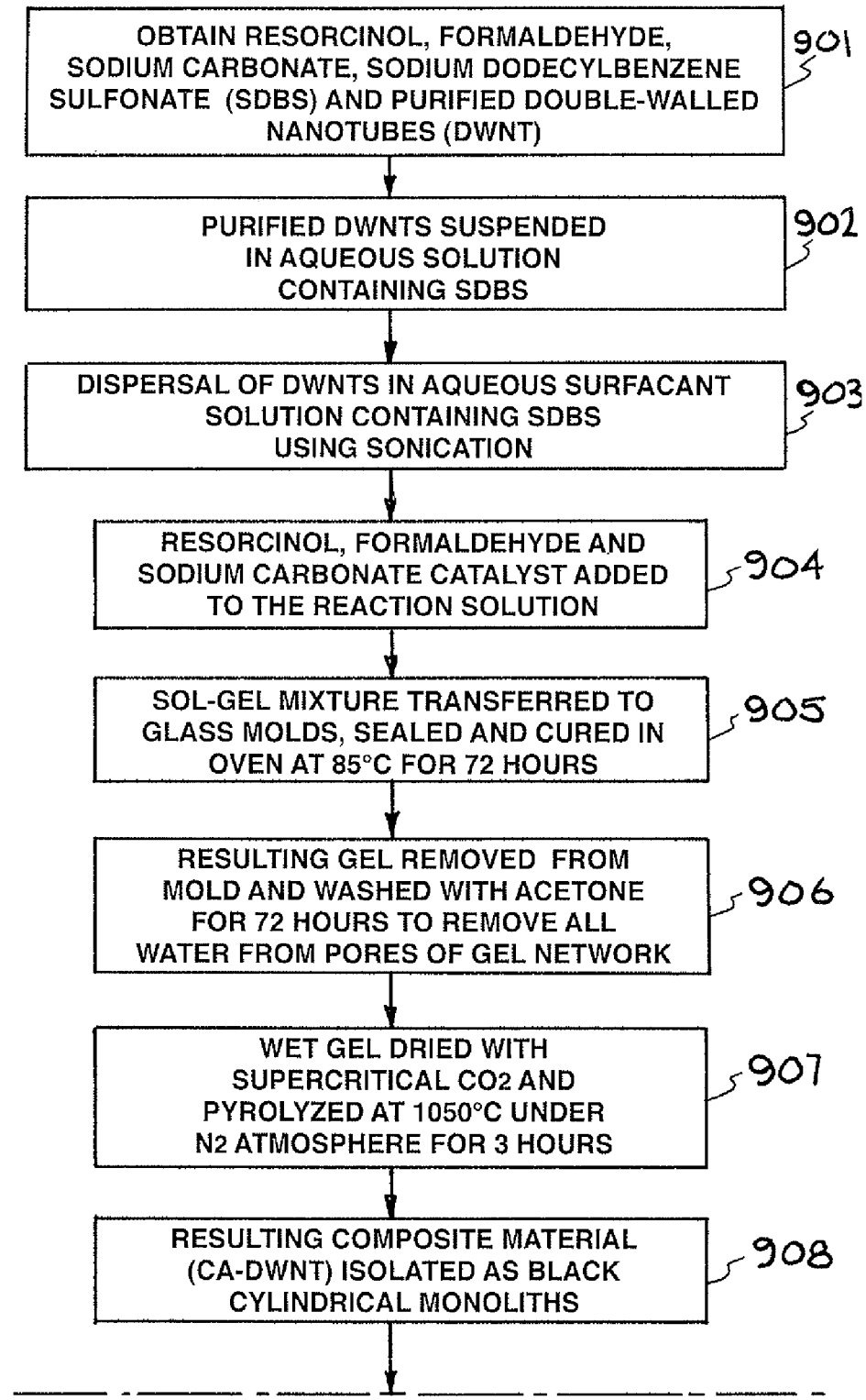
FIG. 9 is a flow chart showing one embodiment of a method of making a metal oxide-carbon composite with carbon nanotubes that make said metal oxide-carbon composite mechanically robust.
Figure 9B:
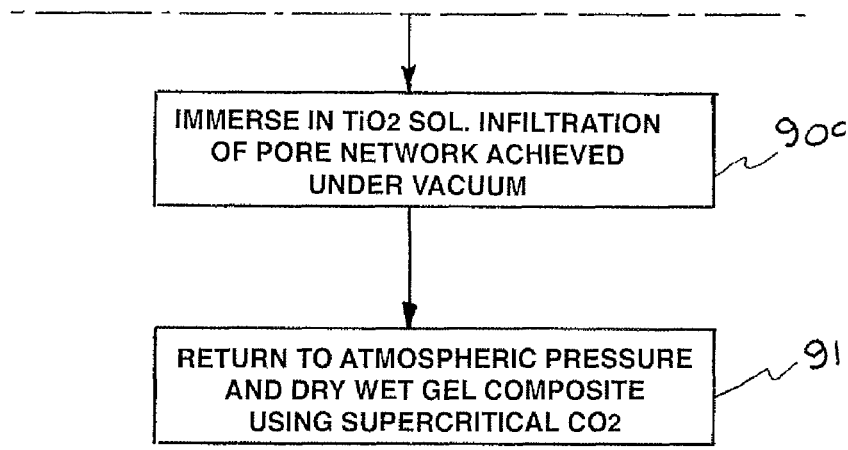

Referring now to FIG. 9 a flow chart illustrates one embodiment of a method of making a carbon aerogel oxide composite in accordance with the present invention. The method is designated generally by the reference number 900. The method 900 includes a number of steps. The steps include dispersing nanotubes in an aqueous media or other media to form a suspension, adding reactants and catalyst to the suspension to create a reaction mixture, curing the reaction mixture to form a wet gel, drying the wet gel to produce a dry gel, pyrolyzing the dry gel to produce a carbon nanotube-based aerogel, immerse the carbon nanotube-based aerogel in a metal oxide sol under a vacuum, returning the carbon nanotube-based aerogel and the metal oxide sol to atmospheric pressure, curing the metal oxide-carbon nanotube-based composite at room temperature, and drying the metal oxide-carbon nanotube-based wet gel composite producing an metal oxide-carbon composite. In one embodiment the step of immersing the carbon nanotube-based aerogel in a metal oxide sol under a vacuum comprises immersing the carbon nanotube-based aerogel in titanium dioxide. In one embodiment the step of immersing the carbon nanotube-based aerogel in a metal oxide sol under a vacuum comprises immersing the carbon nanotube-based aerogel in a metal oxide sol made from Mn, Fe, Co, Ni, Cu, Sn, Al, Si, Zn, Zr sol-gel precursors in combination with catalyst, and sol-gel forming components. Referring again to FIG. 9, the method 900 includes a number of steps. The steps shown include the steps described below.

Step number 901 is "Obtain resorcinol, formaldehyde, sodium carbonate, sodium dodecylbenzene sulfonate (SDBS) and purified double-walled nanotubes (DWNT)."

Step number 902 is "Purified DWNTS suspended in aqueous solution containing SDBS."

Step number 903 is "Dispersal of DWNTS in aqueous surfactant solution containing SDBS using sonication."

Step number 904 is "Resorcinol, formaldehyde and sodium carbonate catalyst added to the reaction solution."

Step number 905 is "Sol-Gel mixture transferred to glass molds sealed and cured in oven at 85° C. for 72 hours."

Step number 906 is "Resulting gel removed from mold and washed with acetone for 72 hours to remove all water from pores of gel network."

Step number 907 is "Wet gel dried with supercritical CO$_2$ and pyrolyzed at 1050° C. under N$_2$ atmosphere for 3 hours."

Step number 908 is "Resulting composite material (CA-DWNT) isolated as black cylinder monoliths."

Step number 909 is "Immerse in titanium dioxide (TiO$_2$) sol: infiltration of pore network achieved under vacuum."

Step number 910 is "Return to atmospheric pressure and dry wet composite using supercritical CO$_2$ producing a metal oxide-carbon composite.

Figure 10A:
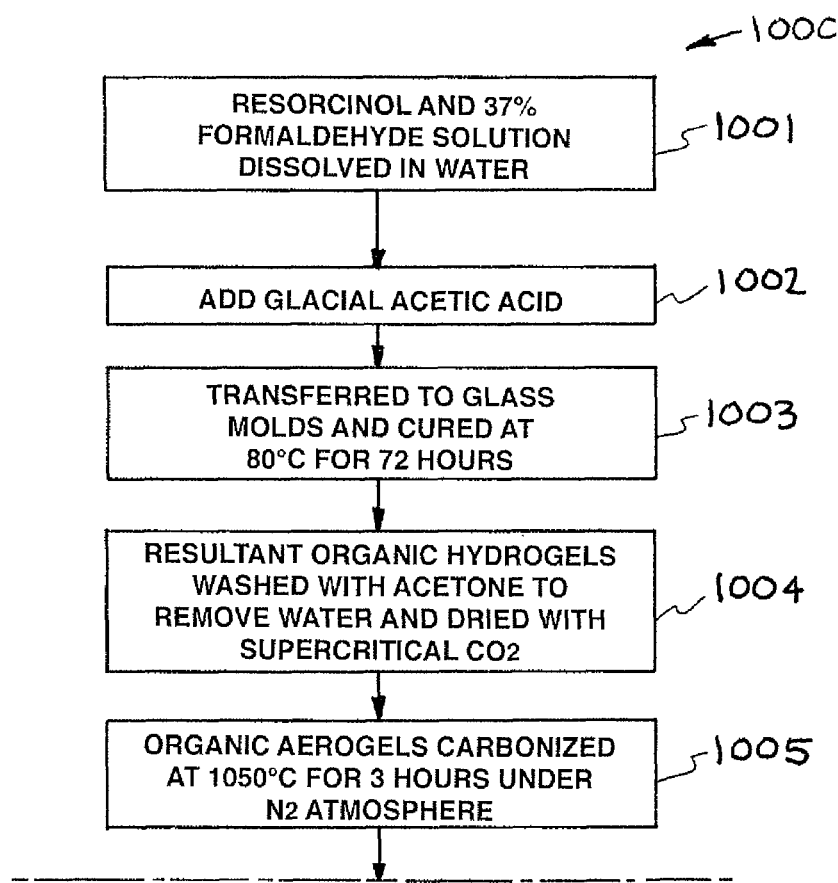
FIG. 10 is a flow chart showing one embodiment of a method of making an metal oxide-carbon composite with an activated carbon aerogel.
Figure 10B:
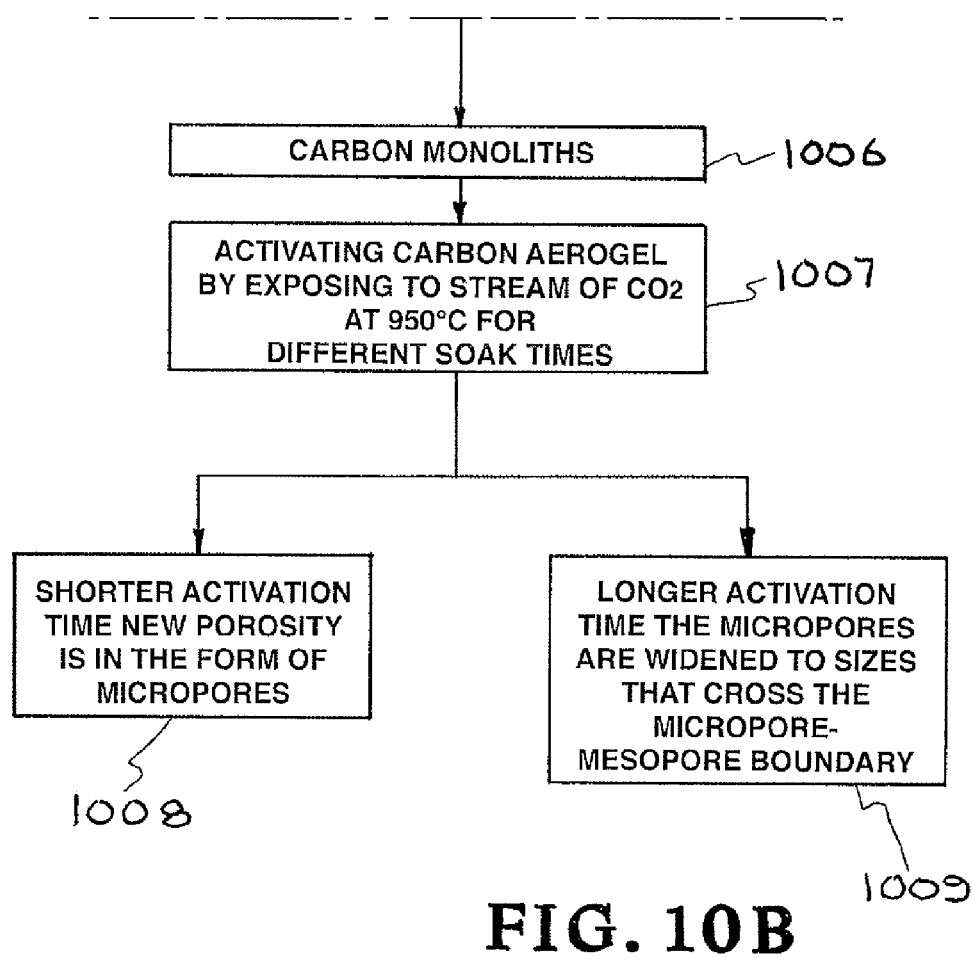
Figure 11:
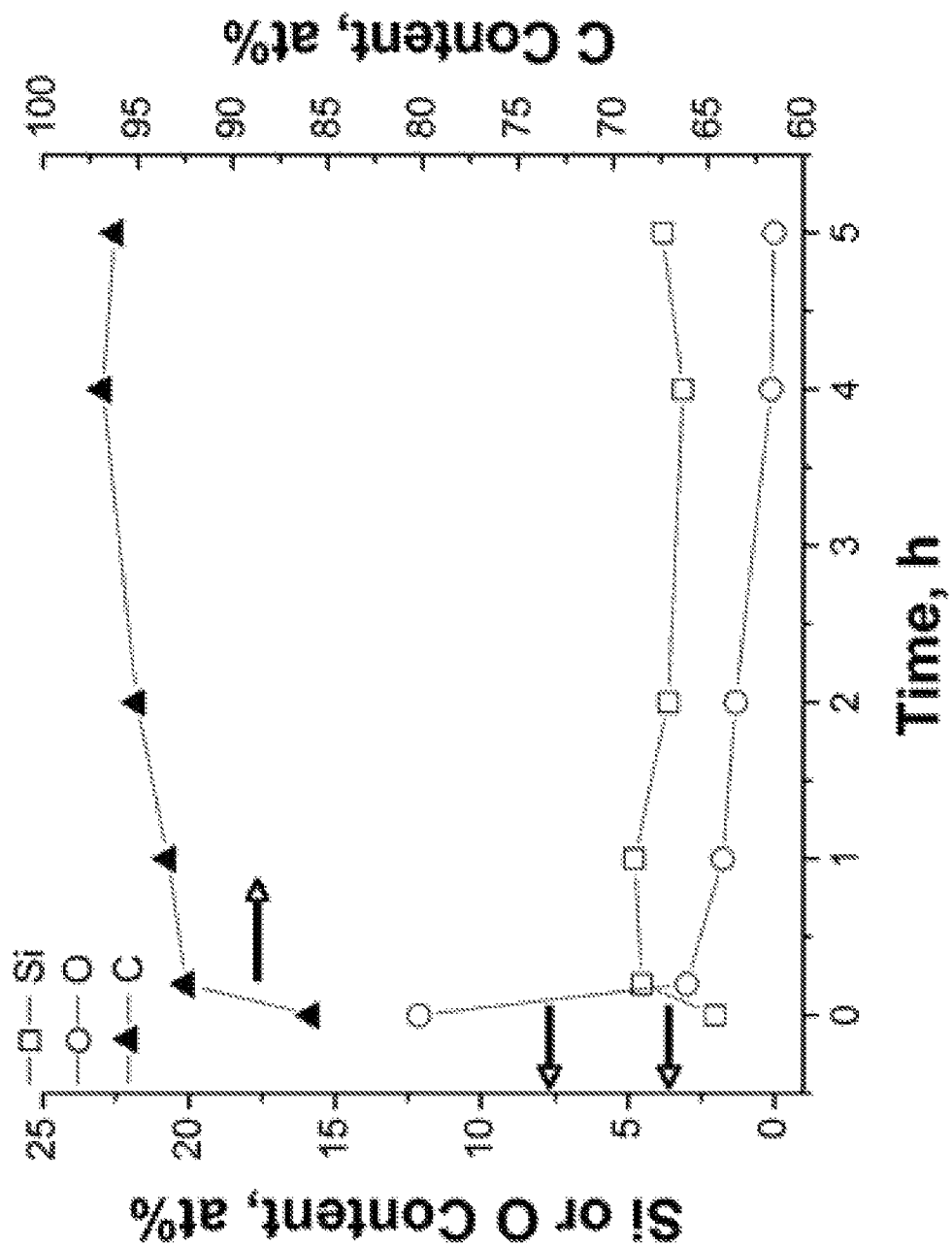
FIG. 11 is a plot of Si, O and C atomic content (EDX) during carbothermal reduction of SiO$^2$/ACA at 1500° C. in Ar as a function of time.
Figure 12:
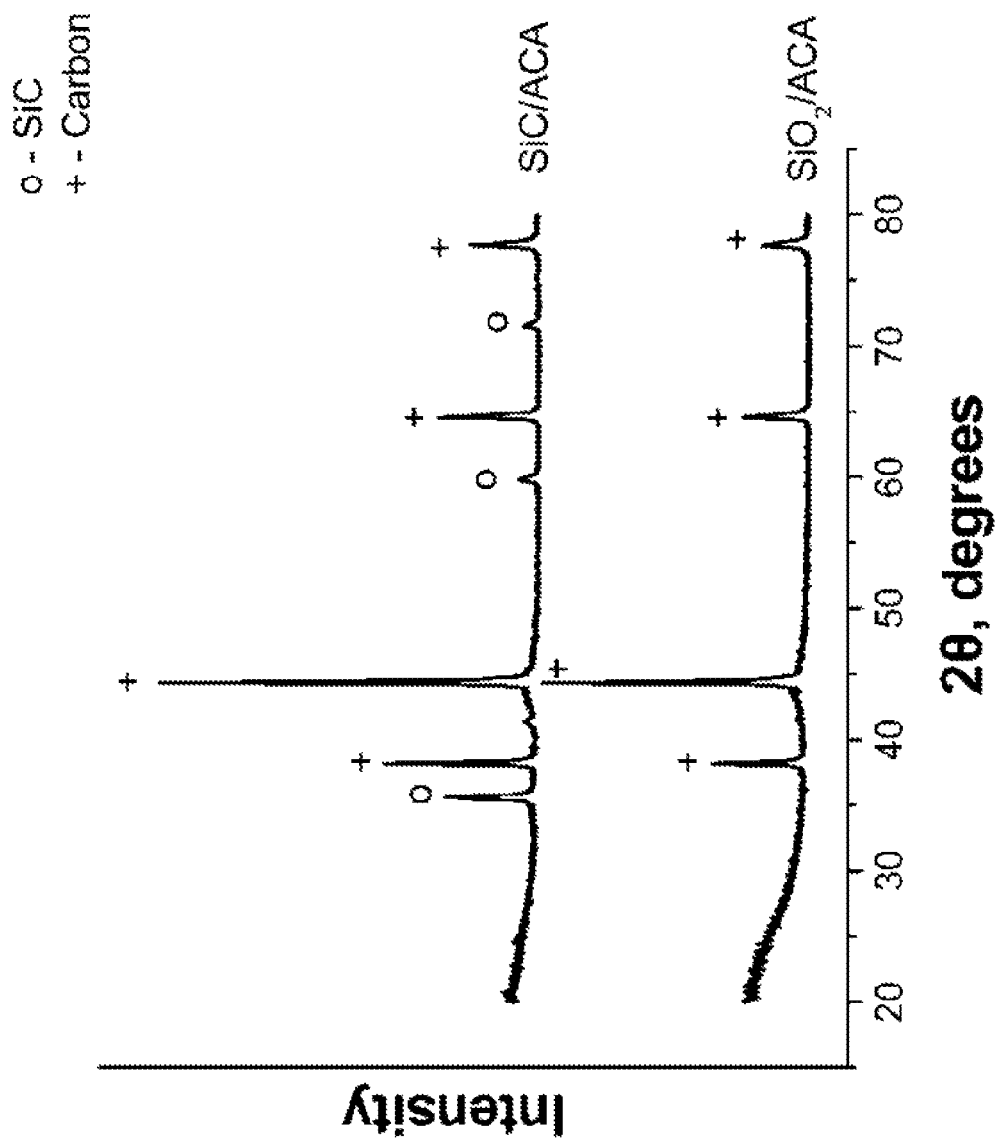
FIG. 12 shows powder XRD patterns for SiC/ACA and SiO$_2$/ACA.
Figure 13:
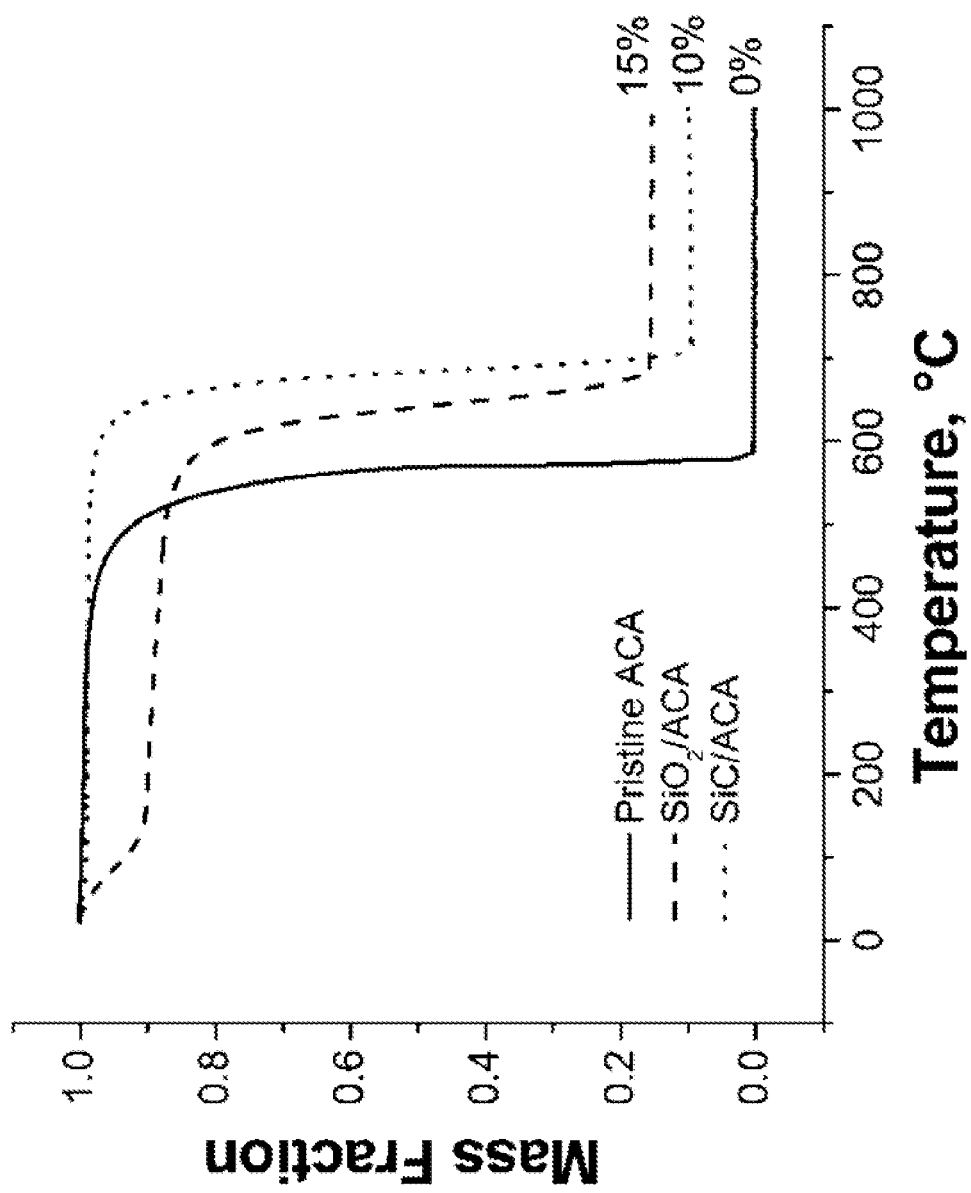
FIG. 13 shows thermogravimetric analysis (TGA) plots of ACA, SiO$_2$/ACA, and SiC/ACA in air.
Figure 14:
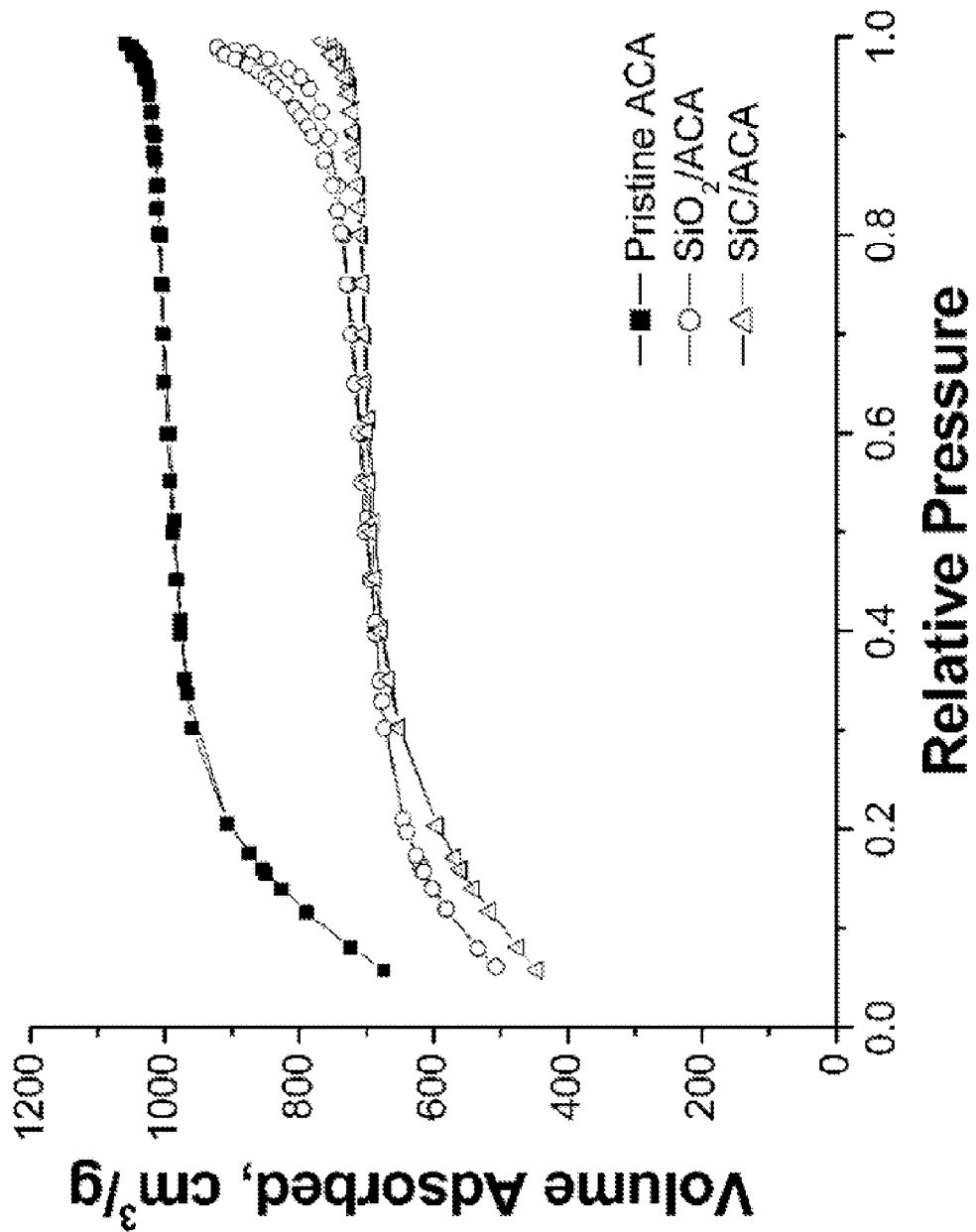
FIG. 14 shows nitrogen adsorption/desorption isotherms for ACA, SiO$_2$/ACA, and SiC/ACA.

Referring now to FIG. 10 a flow chart illustrates an embodiment of a method of making a metal oxide-carbon aerogel composite in accordance with the present invention. The method is designated generally by the reference number 1000. The method 1000 includes a number of steps. The steps include providing an aqueous media or other media to form a suspension, adding reactants and catalyst to the suspension to create a reaction mixture, curing the reaction mixture to form a wet gel, drying the wet gel to produce a dry gel, pyrolyzing the dry gel to produce an aerogel, immerse the aerogel in a metal oxide sol under a vacuum, returning the aerogel and the metal oxide sol to atmospheric pressure, curing the metal oxide sol-infiltrated carbon aerogel, and drying the metal oxide-carbon wet gel composite producing a metal oxide-carbon aerogel composite. In one embodiment the step of immersing the carbon aerogel in a metal oxide sol under a vacuum comprises immersing the carbon aerogel in titanium dioxide sol. In one embodiment the step of immersing the carbon aerogel in a metal oxide sol under a vacuum comprises immersing the carbon aerogel in a metal oxide sol made from Mn, Fe, Co, Ni, Cu, Zn, Zr sol-gel precursors in combination with a catalyst, and sol-gel forming components.

Referring again to FIG. 10, the method 1000 includes a number of steps. The steps shown include the steps described below.

Step number 1001 is "Resorcinol and 37% formaldehyde solution dissolved in water."

Step number 1002 is "Add glacial acetic acid."

Step number 1003 is "Transferred to glass molds and cured at 80° C. for 72 hours."

Step number 1004 is "Resultant organic hydrogels washed with acetone to remove water and dried with supercritical $CO_2$."

Step number 1005 is "Organic aerogels carbonized at 1050° C. for 3 hours under $N_2$ atmosphere."

Step number 1006 is "Carbon monoliths."

Step number 1007 is "Activating carbon aerogel by exposing to stream of $CO_2$ at 950° for different soak times."

Step number 1008 is "Shorter activation time new porosity is in the form of micropores."

Step number 1009 is "Longer activation time. The micropore are widened to sizes that cross the micropore mesopore boundry."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

Additional Embodiments

Additional embodiments are described in Worsley et al., *J. Mater. Chem.*, 2010, 20, 4840-4844, DOI: 10.1039/C0JM00661K.

Recently reported is the synthesis of activated carbon aerogel (ACA) monoliths that exhibited hierarchical porosity and surface areas in excess of 3000 m$^2$ g$^{-1}$. (Reference 10) Previously, it was demonstrated the potential of the ACA material as a support by creating high surface area TiO$_2$-coated and TiCN-coated ACA composites. (Reference 11) Although both the TiO$_2$/ACA and TiCN/ACA maintained high surface areas, oxidation of the composites occurred just above 400° C. in air.

Herein is described the use the ACA material as scaffolds for the synthesis of high surface area silica (SiO$_2$) and silicon carbide (SiC) composites with enhanced thermal stability. Both SiO2 and SiC are known for their stability at high temperatures. (References 6, 12-16) In addition to the advantages such a SiO$_2$/ACA and SiC/ACA material would have as catalyst supports, these materials can have application in lithium ion batteries and methane storage. (References 1, 2, 17)

The composites can be prepared through coating the inner surfaces of monolithic ACA templates with a layer of sol-gel derived silica, (reference18) yielding the SiO$_2$/ACA composite. In a typical synthesis, ACA parts were immersed in the SiO$_2$ sol-gel solution and full infiltration of the ACA pore network by the sol-gel solution was achieved under vacuum. After drying, the amorphous SiO$_2$ overcoat in the composite can then be converted to SiC by carbothermal reduction. To prepare the SiC-coated ACA composite, the as-prepared SiO$_2$/ACA part was heated under flowing nitrogen at 1,500° C. for 5 hours. The SiO$_2$/ACA and SiC/ACA exhibit extremely high BET surface areas (>2000 m$^2$ g$^{-1}$) and retain the porous network structure of the monolithic ACA support.

The surface area of the SiC-coated carbon aerogel can be, for example, at least 60%, or at least 70%, or at least 80%, or at least 90% of the surface area of the original carbon aerogel before the SiC is introduced.

The BET surface area can be, for example, greater than 2,100 m$^2$ g$^{-1}$ or greater than 2,200 m$^2$ g$^{-1}$.

The aerogel can provide a bimodal porosity. For example, one mode for porosity can have a size of about, for example, 10 nm or less, or about 2 nm or less, whereas the other mode for porosity can have a larger pore size of, for example, about 100 nm or more, or about 1 micron or more.

The sol solution can be adapted so that the rate of reaction can be controlled. For example, the rate can be slowed by reducing the concentration of the catalyst. One skilled in the art can vary the concentration of the sol gel catalyst to determine a best concentration or ranges of concentrations for the catalyst. This factor can help reduce pore plugging. For example, it can help reduce pore plugging to have the sol particles nucleate on the surface of the pores which keeps the center of the pores relatively clear. If, for example, sol particles preferred to nucleate in solution (in the middle of the pore away from the surface) it could more easily grow to block the pore. One can have macropores to allow access to the smaller pores without plugging.

The reduction of silica to silicon carbide occurs according to the following equation (see references 19, 20):

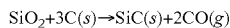

$$SiO_2+3C(s) \rightarrow SiC(s)+2CO(g)$$

Surface areas determination and pore volume analysis is described in reference 21.

Additional methods for making the coatings include atomic layer deposition (ALD).

In additional embodiments, carbon aerogels including activated carbon aerogels can also be coated with alumina. The alumina coating can be deposited by sol gel or atomic layer deposition (ALD) methods. In other embodiments, the alumina is coated on the aerogel by immersing the aerogel in an alumina sol in a similar method as described above for the silicon oxide coating.

For example, in a typical synthesis, an activated carbon aerogel (ACA) monolith with surface area greater than 3,000 m$^2$/g is placed under vacuum and heated to >150° C. Atomic layer deposition of alumina on the inner surfaces of the carbon aerogel can be achieved by sequentially pulsing Al(CH$_3$)$_3$ and H$_2$O into the vacuum chamber with sufficient purge steps in between. When the desired thickness of alumina is achieved, the Al$_2$O$_3$/ACA composite can be removed from the chamber.

In a typical synthesis, for example, aluminum salts, such as aluminum chloride, in either water and/or alcohol, are combined with an organic epoxide (e.g. ethylene oxide, propylene oxide) to prepare an alumina sol. An activated carbon aerogel (ACA) monolith with surface area greater than 3000 m$^2$/g can be immersed in the alumina sol in a glass vial and held under vacuum to ensure full penetration of the sol in the carbon aerogel. The reaction mixture can be then cured at room temperature for 24 h. The wet composite can be washed in ethanol and dried by supercritical extraction in $CO_2$ to yield an $Al_2O_3$/ACA composite.

REFERENCES

1 Lee et al., *Electrochem. Commun.*, 2004, 6, 465-469.
2 Li et al., *J. Nat. Gas Chem.*, 2007, 16, 363-370.
3 Li et al., *Chem. Phys. Lett.*, 2005, 404, 25-29.
4 Mishra et al., *Nanotechnology*, 2008, 19, 445607.
5 Boon et al., *Carbon*, 1996, 34, 567-579.
6 Nhut et al., *Catal. Today*, 2002, 76, 11-32.
7 Sakthivel et al., *Angew. Chem., Int. Ed.*, 2003, 42, 4908-4911.
8 Zheng et al., *J. Mol. Catal. A: Chem.*, 2009, 301, 79-83.
9 Stegenga et al., *Carbon*, 1992, 30, 577-585.
10 Baumann, et al., *J. Non-Cryst. Solids*, 2008, 354, 3513-3515.
11 Worsley et al., *J. Mater. Chem.*, 2009, 19, 7146-7150.
12 Hasegawa, et al., *J. Mater. Chem.*, 2009, 19, 7716-7720.
13 Keller, et al., *J. Mater. Sci.*, 1999, 34, 3189-3202.
14 Krawiec et al., *J. Solid State Chem.*, 2006, 179, 2281-2289.
15 Ledoux, et al., *J. Catal.*, 1988, 114, 176-185.
16 Wang, et al., *Chem. Commun.*, 2010, 46, 303-305.
17 Yang, et al., *Solid State Ionics*, 2002, 152, 125-129.
18 Kucheyev, et al., *J. Phys. D: Appl. Phys.*, 2009, 42, 182003-182006.
19 Vix-Guterl et al., *Carbon*, 1997, 35, 1587-1592.
20 Preiss, et al., *Carbon*, 1995, 33, 1739-1746.
21 Gregg et al., *Adsorption, Surface Area and Porosity*, Academic, London, 2nd edn, 1982.

14 ADDITIONAL EMBODIMENTS DESCRIBED IN U.S. SER. NO. 12/694,425

Fourteen embodiments were described and claimed in U.S. Ser. No. 12/694,425 as described below.

Embodiment 1

A method of making a metal oxide-carbon composite, comprising the steps of: providing a carbon aerogel, immersing said carbon aerogel in a metal oxide sol under a vacuum, returning said carbon aerogel with said metal oxide sol to atmospheric pressure, curing said carbon aerogel with said metal oxide sol to produce a metal oxide-carbon wet gel composite, and drying said metal oxide-carbon wet gel composite so producing a metal oxide-carbon composite.

Embodiment 2

The method of making a metal oxide-carbon composite of embodiment 1 wherein said step of providing a carbon aerogel comprises providing an activated carbon aerogel.

Embodiment 3

The method of making a metal oxide-carbon composite of embodiment 1 wherein said step of providing a carbon aerogel comprises providing a carbon aerogel carbon aerogel with carbon nanotubes that make said carbon aerogel mechanically robust.

Embodiment 4

The method of making a metal oxide-carbon composite of embodiment 1 wherein said step of immersing said carbon aerogel in a metal oxide sol under a vacuum comprises immersing said carbon aerogel in titanium dioxide.

Embodiment 5

The method of making a metal oxide-carbon composite of embodiment 1 wherein said step of immersing said carbon aerogel in a metal oxide sol under a vacuum comprises immersing said carbon aerogel in a metal oxide sol made from Mn, Fe, Co, Ni, Cu, Zn, Zr salts in combination with propylene oxide, and sol-gel forming components.

Embodiment 6

The method of making a metal oxide-carbon composite of embodiment 1 wherein said step of immersing said carbon aerogel in a metal oxide sol under a vacuum comprises immersing said carbon aerogel in a metal oxide sol for metal species including but not limited to manganese, iron, cobalt, nickel, copper, zinc, zirconium, tin, aluminum and chromium.

Embodiment 7

A method of making a metal oxide-carbon composite, comprising the steps of: providing an aqueous media or other media to form a suspension, adding reactants and catalyst to said suspension to create a reaction mixture, curing said reaction mixture to form a wet gel, drying said wet gel to produce a dry gel, pyrolyzing said dry gel to produce an aerogel, immerse said aerogel in a metal oxide sol under a vacuum, returning said aerogel and said metal oxide sol to atmospheric pressure, curing said sol, and drying said sol-gel producing a metal oxide-carbon composite.

Embodiment 8

A metal oxide-carbon composite, comprising: a carbon aerogel, said carbon aerogel having inner surfaces, and an oxide coating said inner surfaces of said carbon aerogel providing a metal oxide-carbon composite.

Embodiment 9

The metal oxide-carbon composite of claim 8 wherein said carbon aerogel is a carbon aerogel with carbon nanotubes that make said carbon aerogel mechanically robust.

Embodiment 10

The metal oxide-carbon composite of embodiment 8 wherein said carbon aerogel is an activated carbon aerogel.

Embodiment 11

The metal oxide-carbon composite of embodiment 8 wherein said oxide is titanium oxide.

Embodiment 12

The metal oxide-carbon composite of embodiment 8 wherein said oxide is an oxide from metal oxide made with forming precursors including but not limited to manganese or iron or cobalt or nickel or copper or zinc or zirconium or aluminum or silicon or tin salts or alkoxides.

Embodiment 13

A metal oxide-carbon composite, comprising: a carbon aerogel with carbon nanotubes that make said carbon aerogel mechanically robust, said carbon aerogel having inner surfaces, and an oxide coating said inner surfaces of said carbon aerogel providing an metal oxide-carbon composite.

Embodiment 14

A metal oxide-carbon composite, comprising: an activated carbon aerogel, said activated carbon aerogel having inner surfaces, and an oxide coating said inner surfaces of said activated carbon aerogel providing an metal oxide-carbon composite.

This concludes the 14 embodiments.

What is claimed is:

1. A composition comprising at least one carbon aerogel and at least one silica coating or at least one silicon carbide coating disposed on the aerogel, wherein the composition has a surface area of at least 2,000 m$^2$/g.

2. The composition of claim 1, wherein the composition comprises at least one silicon carbide coating on the aerogel.

3. The composition of claim 1, wherein the composition comprises at least one silicon carbide coating on the aerogel, and wherein the oxygen content is zero according to energy dispersion x-ray analysis.

4. The composition of claim 1, wherein the composition comprises at least one silicon carbide coating on the aerogel, wherein the coating comprises silicon carbide nanocrystals.

5. The composition of claim 1, wherein the composition comprises at least one silica coating on the aerogel.

6. The composition of claim 1, wherein the carbon aerogel is an activated carbon aerogel.

7. The composition of claim 1, wherein the carbon aerogel comprises carbon nanotubes.

8. The composition of claim 1, wherein the carbon aerogel has a surface area of greater than 3,000 m$^2$/g before the coating is disposed on the aerogel.

9. The composition of claim 1, wherein the coating is a conformal coating.

10. The composition of claim 1, wherein the coating improves the thermal stability of the carbon aerogel according to TGA.

11. The composition of claim 1, wherein the composition is mostly microporous with remaining pore volume primarily in the large meso- and macroporous range.

12. The composition of claim 1, wherein the silica comprises sol-gel-derived silica.

13. The composition of claim 1, wherein the silicon carbide is formed as a carbothermal reduction of a silica coating.

14. The composition of claim 1, wherein the coating comprises substantially no silicon oxide.

15. The composition of claim 1, wherein the aerogel has a bimodal porosity.

16. The composition of claim 1, wherein the carbon aerogel is an activated carbon aerogel and the silicon carbide coating is present, and the composition has a surface area of at least 2,000 m$^2$/g.

17. The composition of claim 1, wherein the carbon aerogel is an activated carbon aerogel and the silicon carbide coating is present, and the composition has a surface area of at least 2,000 m$^2$/g, and wherein the carbon aerogel has a surface area of greater than 3,000 m$^2$/g before the coating is disposed on the aerogel.

18. A composition comprising at least one activated carbon aerogel and at least one silicon carbide coating disposed on the activated carbon aerogel, wherein the composition has a surface area of at least 2,000 m$^2$/g.

19. The composition of claim 18, wherein the silicon carbide coating increases the thermal stability of the composition.

20. A method comprising:
forming a silica coating on a carbon aerogel, wherein the silica coating comprises sol-gel-derived silica,
heating the coated aerogel to thermally convert the silica coating into a silicon carbide coating.

21. The method of claim 20, further comprising drying the coated aerogel by supercritical extraction in carbon dioxide prior to heating.

22. The method of claim 20, wherein the silicon carbide coating comprises a layer of SiC nanocrystals.

23. The method of claim 20, wherein the coated and heated aerogel has a surface area greater than about 2,000 m$^2$/g.

24. The method of claim 20, wherein the silica coating and the silicon carbide coating are formed on inner surfaces of the aerogel.

25. The method of claim 20, wherein the carbon aerogel is an activated carbon aerogel.

26. The method of claim 20, wherein the carbon aerogel has a bimodal porosity.

27. The method of claim 20, wherein the carbon aerogel has a bimodal porosity, wherein one mode has a pore size of about 10 nm or less, and the other mode has a pore size of about 100 nm or more.

28. The method of claim 20, wherein carbon aerogel has a surface area of at least about 3,000 m$^2$/g.

29. A method, comprising:
coating the inner surface of an activated carbon aerogel (ACA) with a silica sol,
reacting the silica sol to undergo gelation and form a silica sol-gel,
curing and drying the sol-gel to nucleate silicon oxide particles to yield a SiO$_2$/ACA composite, and
heating the SiO$_2$/ACA composite to form a SiC/ACA composite.

30. The method of claim 29, wherein the silica sol fills the pore volume prior to gelation.

31. The method of claim 29, wherein the SiC/ACA composite comprises a surface area greater than about 2,000 m$^2$/g.

32. The method of claim 29, wherein during the heating step, the SiO$_2$ is completely converted to SiC.

33. The method of claim 29, wherein said heating comprises heating at about 1,500° C.

* * * * *